United States Patent
Chen

(10) Patent No.: US 11,159,097 B2
(45) Date of Patent: Oct. 26, 2021

(54) FWS DC-AC GRID CONNECTED INVERTER

(71) Applicant: Redx Technology Australia Pty Ltd, Helensvale (AU)

(72) Inventor: Xue Jian Chen, Paradise Point (AU)

(73) Assignee: Redx Technology Australia Pty Ltd, Helensvale (AU)

( * ) Notice: Subject to any disclaimer, the term of this patent is extended or adjusted under 35 U.S.C. 154(b) by 0 days.

(21) Appl. No.: 16/679,148

(22) Filed: Nov. 8, 2019

(65) Prior Publication Data
US 2020/0252003 A1    Aug. 6, 2020

Related U.S. Application Data

(60) Provisional application No. 62/757,168, filed on Nov. 8, 2018.

(51) Int. Cl.
*H02M 7/5387* (2007.01)
*H02J 3/38* (2006.01)
*H02J 3/46* (2006.01)
*H02M 1/00* (2006.01)
*H02M 3/158* (2006.01)

(52) U.S. Cl.
CPC ......... *H02M 7/53873* (2013.01); *H02J 3/381* (2013.01); *H02J 3/46* (2013.01); *H02M 1/007* (2021.05); *H02M 3/1584* (2013.01)

(58) Field of Classification Search
CPC ........... H02M 3/1584; H02M 7/53873; H02M 2001/0058; H02M 2001/007; H02J 3/381
See application file for complete search history.

(56) References Cited

U.S. PATENT DOCUMENTS

2012/0236616 A1*   9/2012   Zacharias ............... H02J 3/381
                                                                363/132
2019/0379288 A1*  12/2019   Chaput ............... H02M 3/1582

* cited by examiner

*Primary Examiner* — Peter M Novak
(74) *Attorney, Agent, or Firm* — Jundong Ma

(57) ABSTRACT

A new class of DC-AC inverter consists of a buck or two buck converters and two or four low frequency switches, and it achieves ultra-high efficiency, reactive power flow capability, small size and low cost in grid-connected applications.

11 Claims, 30 Drawing Sheets

(illustrating an invented DC-AC Inverter with two buck converters and two low frequency switches)

(illustrating general form of an invented DC-AC Inverter)

(illustrating an exemplary choice of the buck converter in FIG. 1A)

(illustrating an exemplary choice of the buck converter in Fig. 1A)

(showing an invented DC-AC Inverter with one buck converter and four low frequency switches)

(Bidirectional Cell Comparison)

(Prior Art Basic FB Inverter)

(Prior Art H5 Inverter)

(Prior Art HERIC FB Inverter)

(Prior Art NPC Inverter)

(Prior Art two buck inverter)

(illustrating an invented DC-AC Inverter with two buck converters and two low frequency switches)

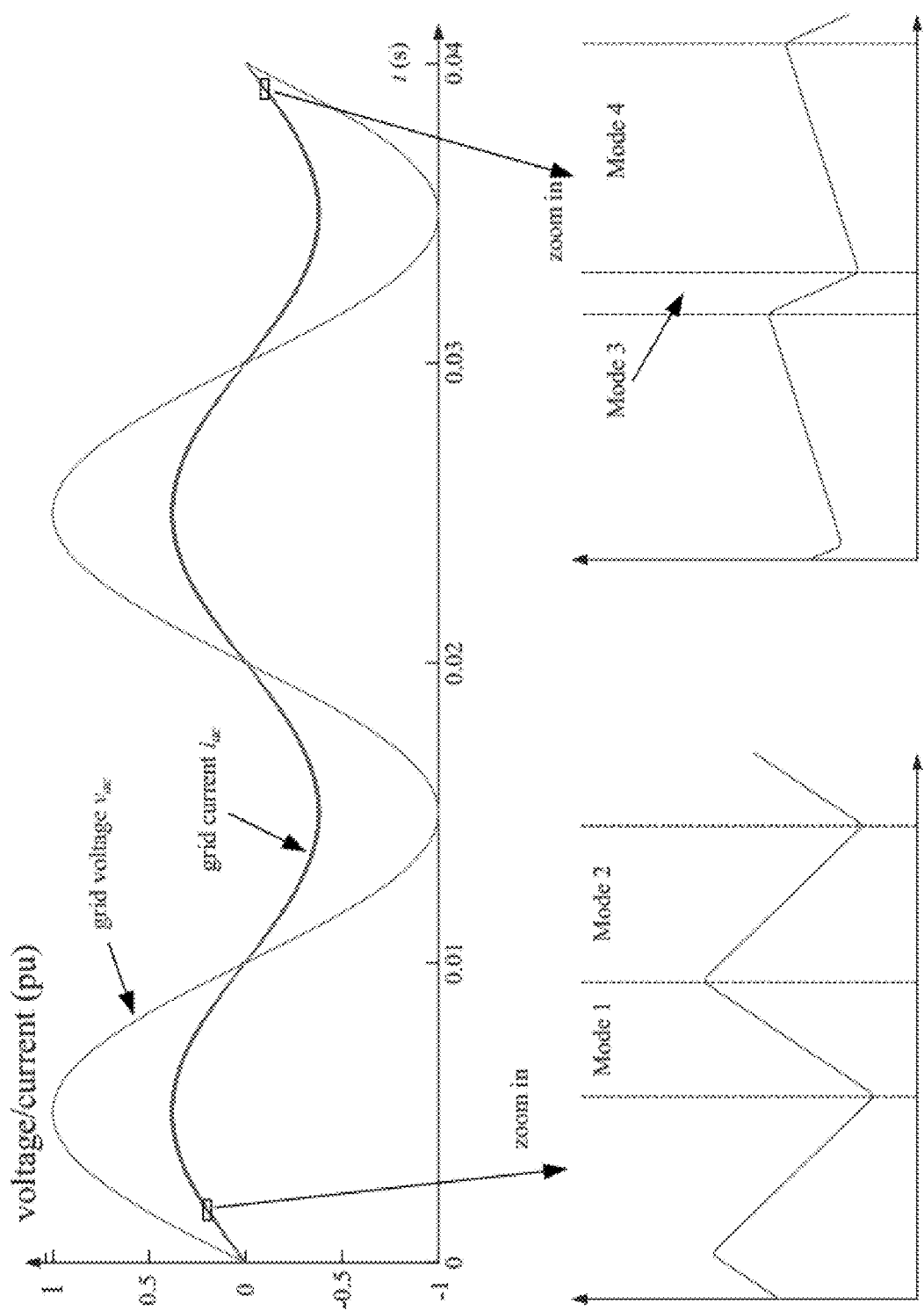
FIG. 3B-a
(illustrating a modulation strategy of an invented DC-AC inverter for FIG. 3A)

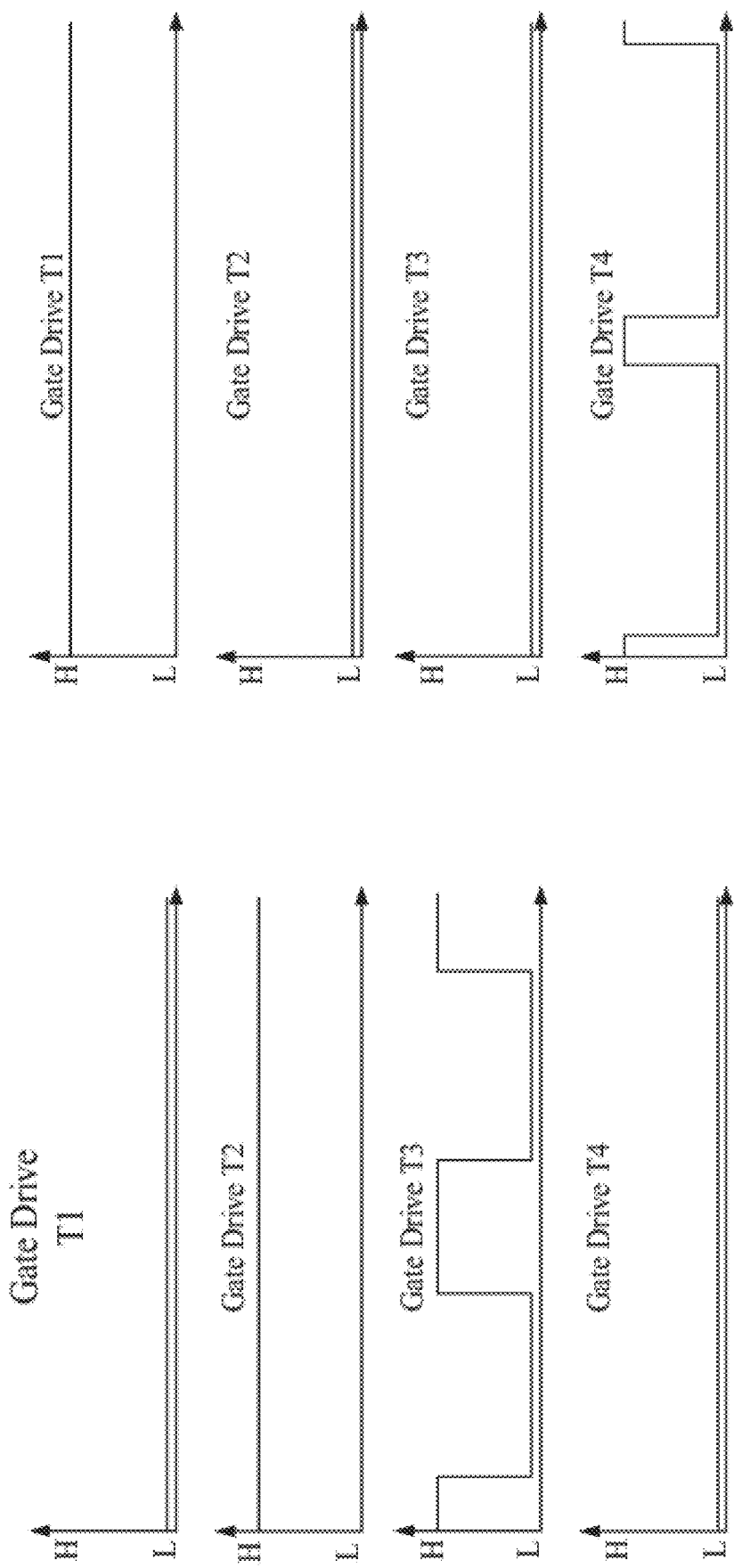
FIG. 3B-b
(illustrating a modulation strategy of an invented DC-AC inverter for FIG. 3A)

(Modulation timing)

(Modulation timing)

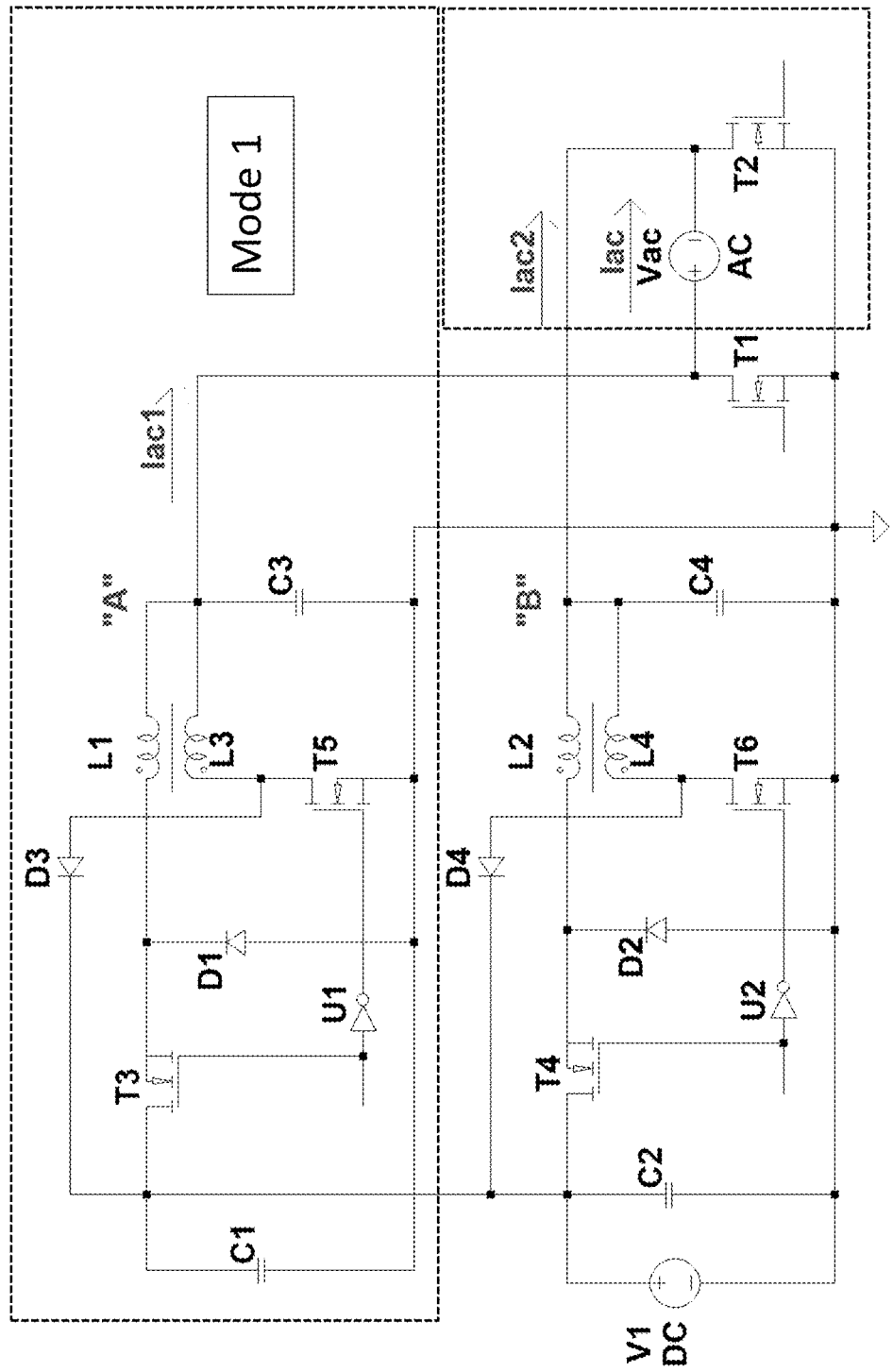
FIG. 4A-a (Operation Mode 1)

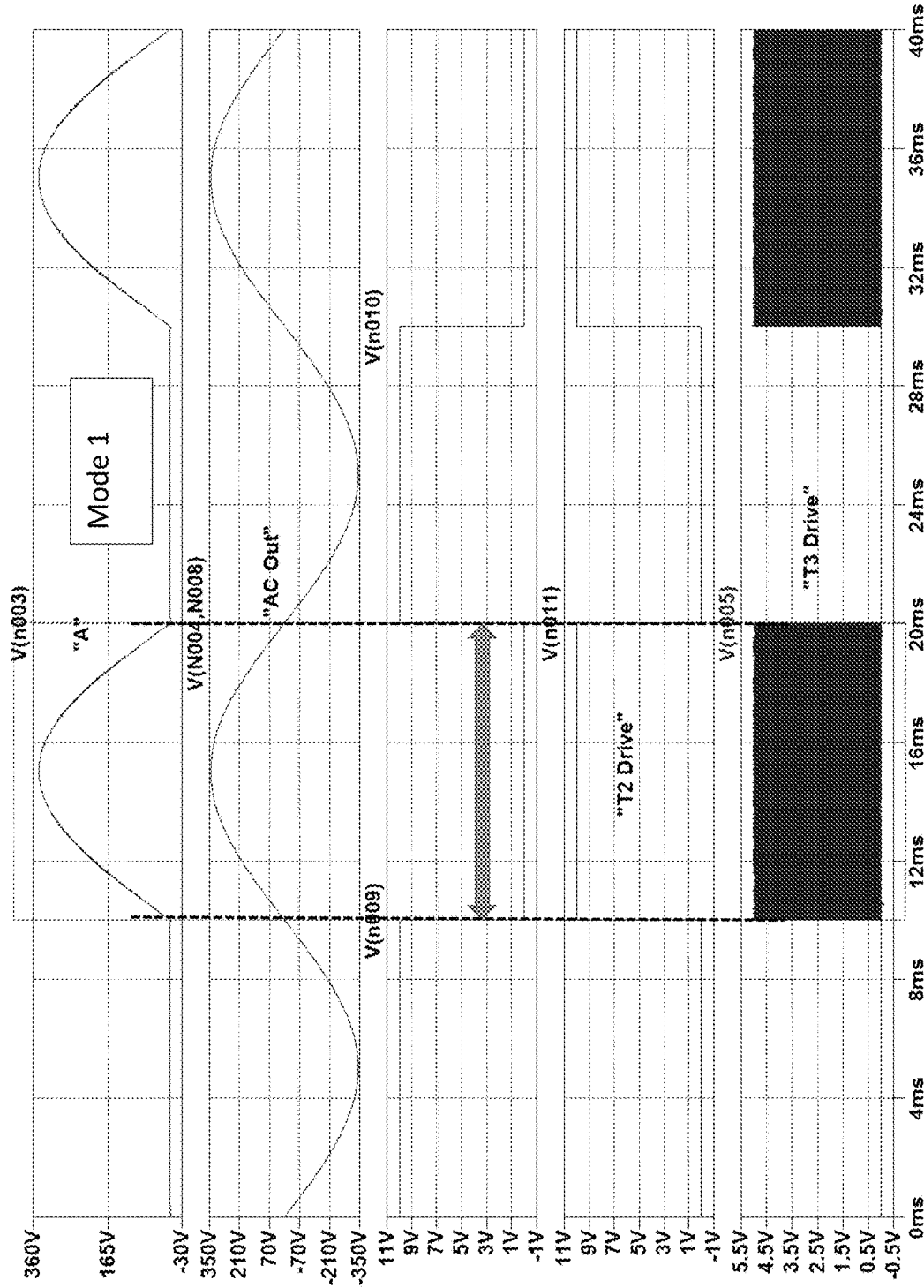
FIG. 4A-b
(Operation Mode 1)

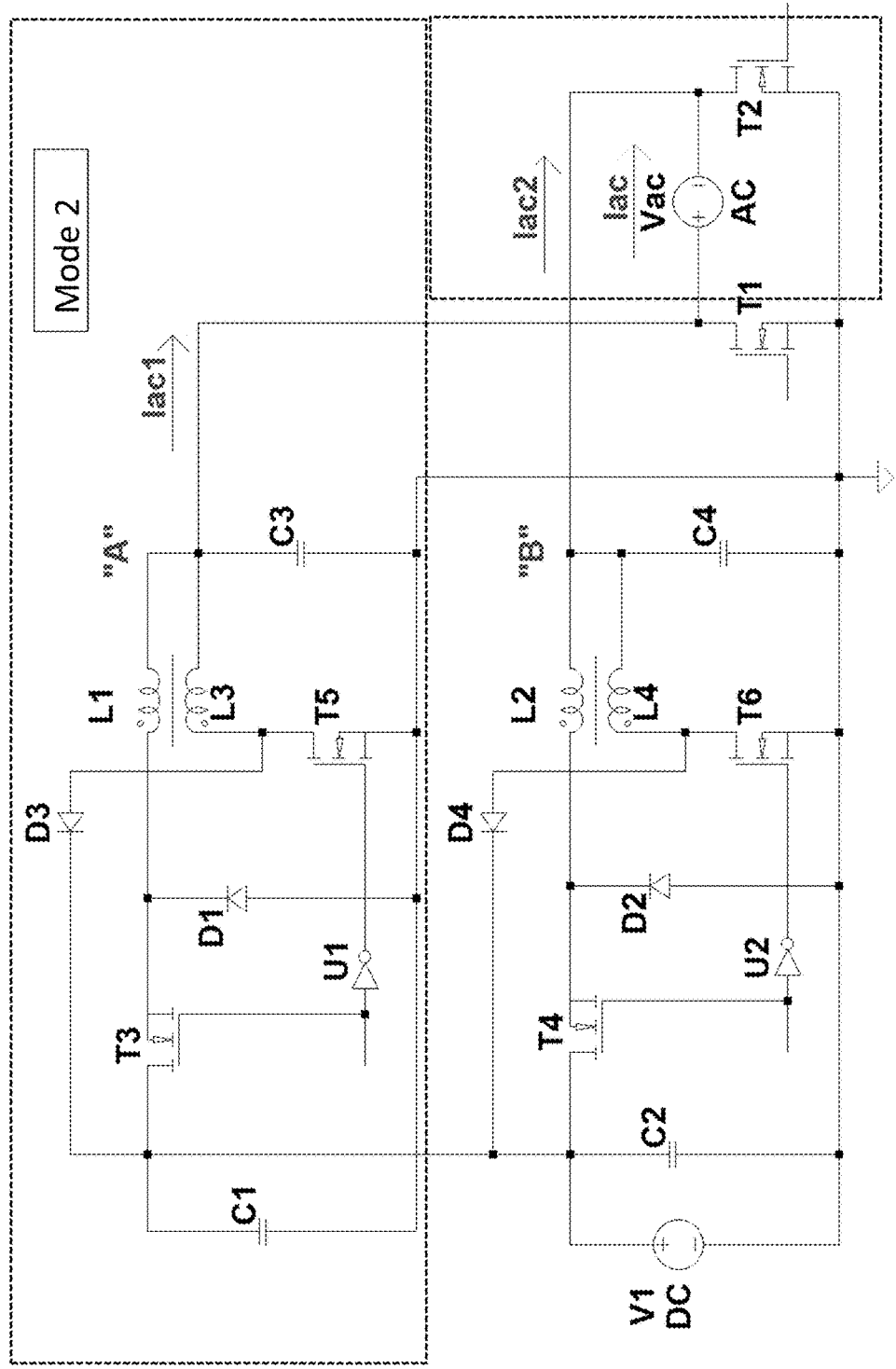
FIG. 4B-a
(Operation Mode 2)

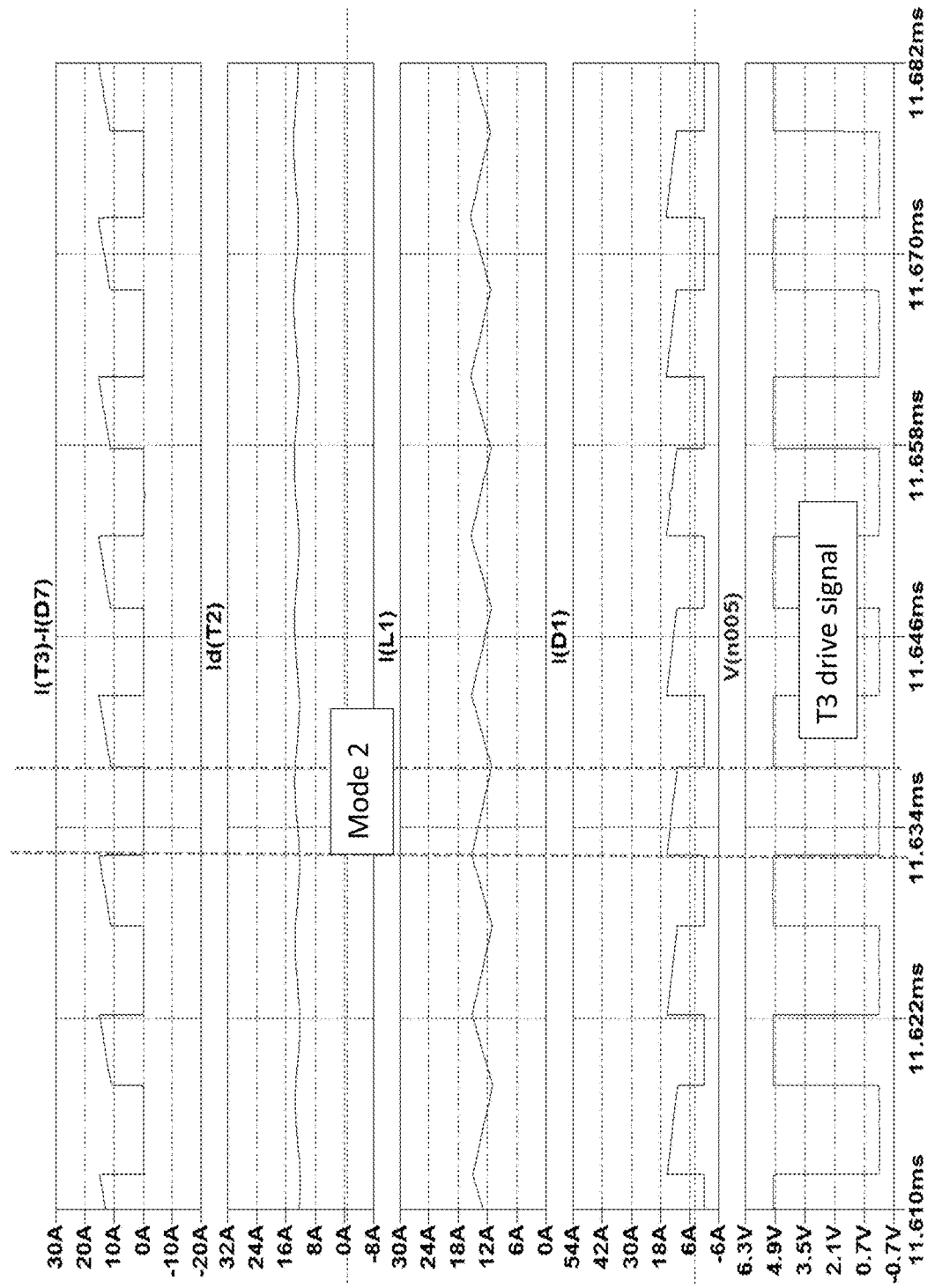
FIG. 4B-b
(Operation mode 2)

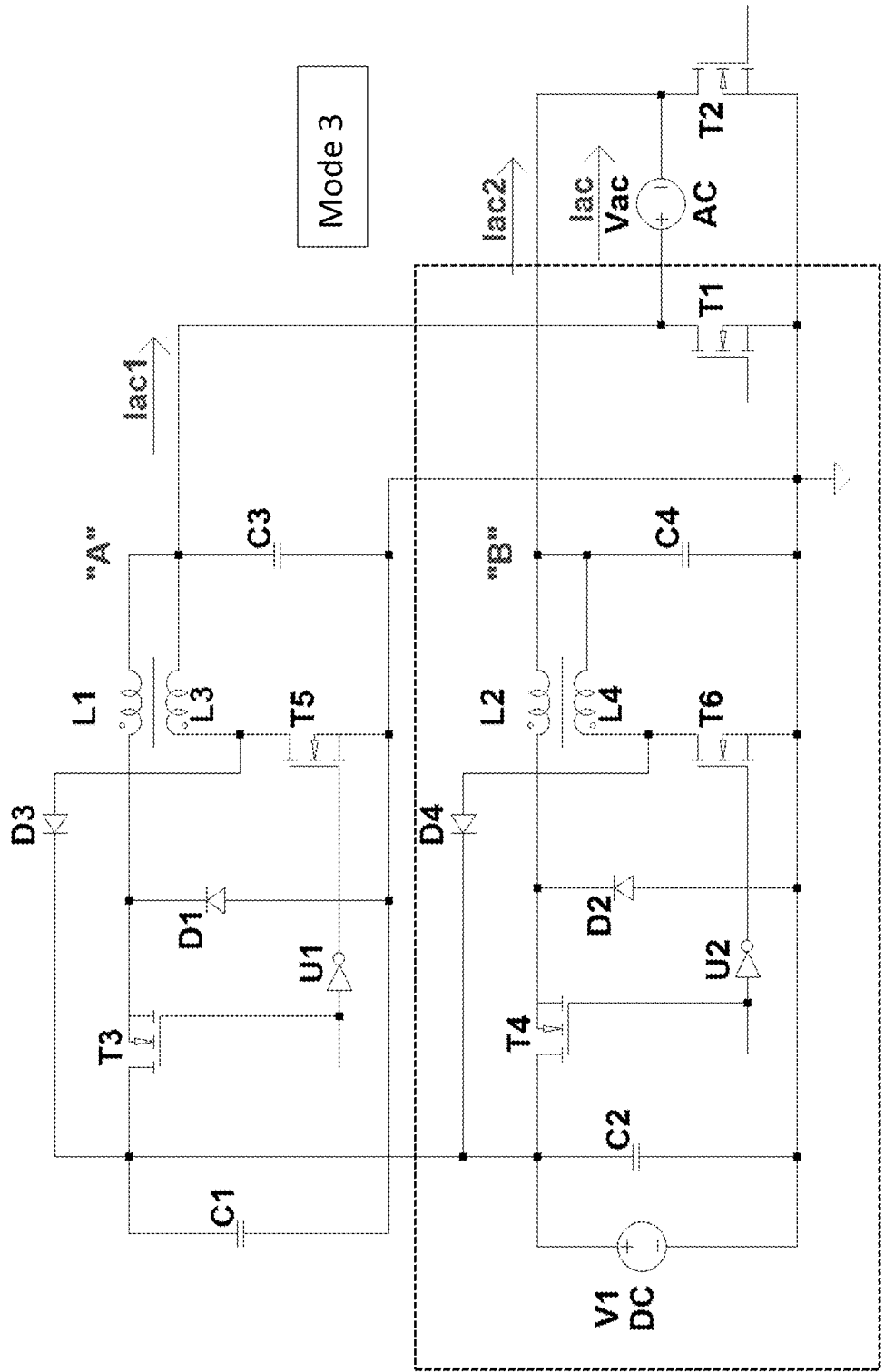
FIG. 4C-a
(Operation Mode 3)

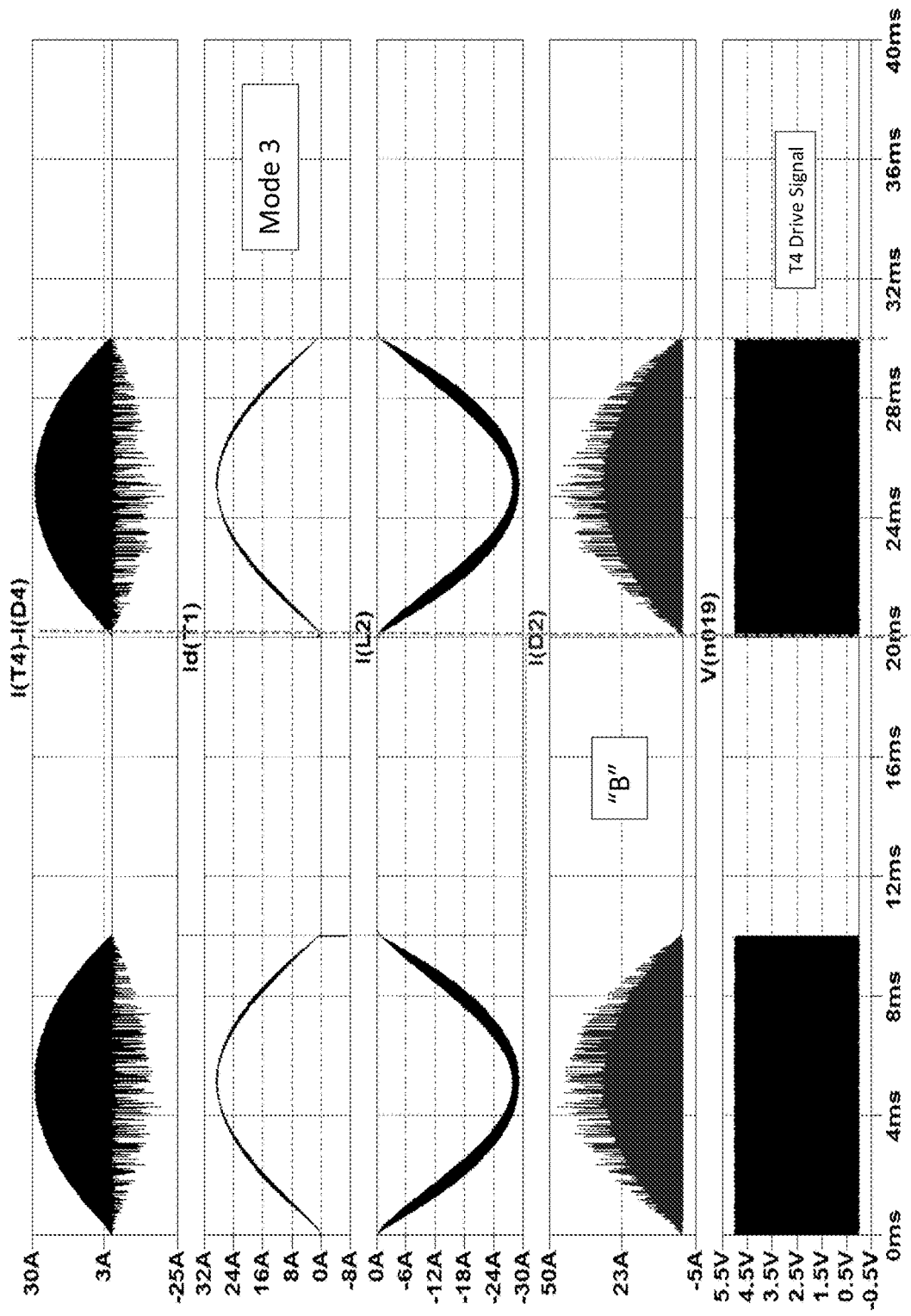
FIG. 4C-b
(Operation Mode 3)

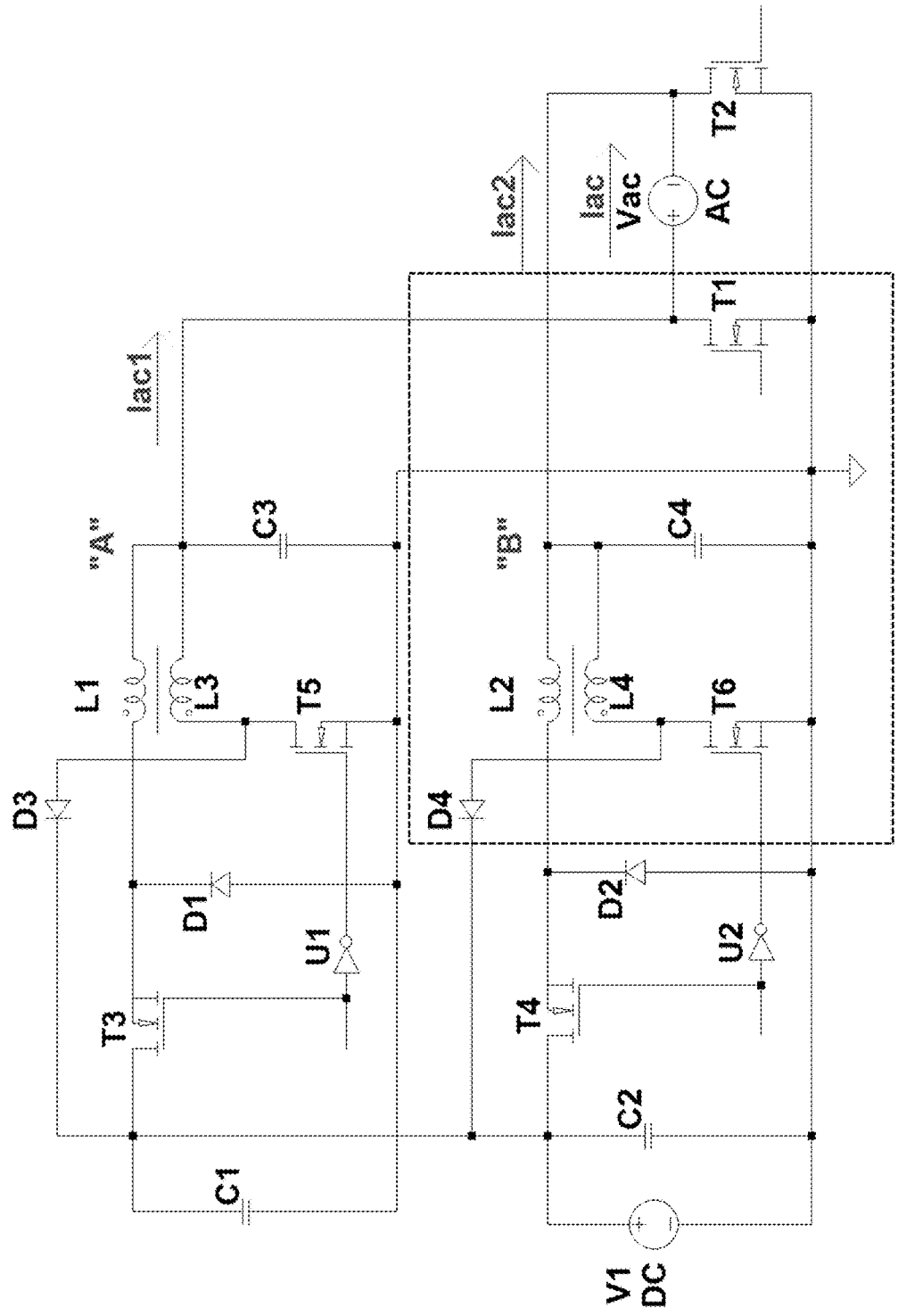
FIG. 4D-a
(Operation Mode 4)

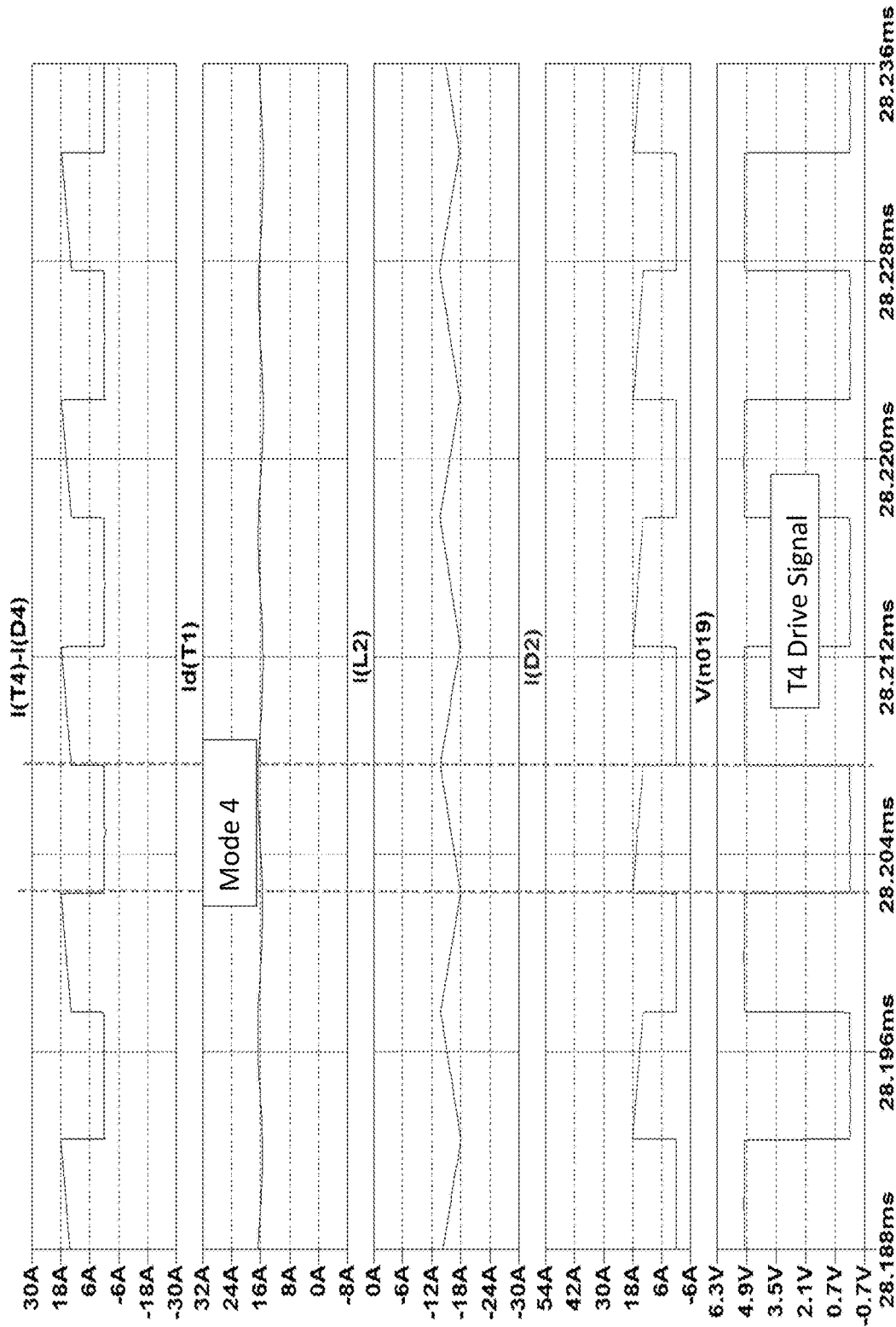
FIG. 4D-b
(Operation Mode 4)

(Reactive power flow, a large inductor series
Or large capacitor parallel with Vac)

(Inductive load (lagging) 63 degree
Power factor=0.454)

(capacitive load (leading) 75.6 degree
Power factor=0.25)

FWS DC-AC GRID CONNECTED INVERTER

CROSS-REFERENCE TO RELATED APPLICATION

This application claims the benefit under 35 U.S.C. § 119(e) of Provisional Patent Application No. 62/757,168, filed Nov. 8, 2018, the entire disclosure of which is hereby incorporated by reference.

RELATED ART

The present disclosure relates to a DC-AC power inverter, particularly for grid-connected applications. In the past decade, some new power conversion topologies were proposed for grid-connected applications to achieve higher efficiency, lower cost and smaller footprint. The following publications are just some of the latest proposed topologies in this endeavor:

1. S. Dutta and K. Chatterjee, "A Buck and Boost Based Grid Connected PV Inverter Maximizing Power Yield From Two PV Arrays in Mismatched Environmental Conditions," in IEEE Transactions on Industrial Electronics, vol. 65, no. 7, pp. 5561-5571, July 2018.
2. S. Strache, R. Wunderlich and S. Heinen, "A Comprehensive, Quantitative Comparison of Inverter Architectures for Various PV Systems, PV Cells, and Irradiance Profiles," in IEEE Transactions on Sustainable Energy, vol. 5, no. 3, pp. 813-822, July 2014.
3. L. Zhou, F. Gao and T. Xu, "A Family of Neutral-Point-Clamped Circuits of Single-Phase PV Inverters: Generalized Principle and Implementation," in IEEE Transactions on Power Electronics, vol. 32, no. 6, pp. 4307-4319, June 2017.
4. J. F. Ardashir, M. Sabahi, S. H. Hosseini, F. Blaabjerg, E. Babaei and G. B. Gharehpetian, "A Single-Phase Transformerless Inverter With Charge Pump Circuit Concept for Grid-Tied PV Applications," in IEEE Transactions on Industrial Electronics, vol. 64, no. 7, pp. 5403-5415, July 2017.
5. S. Saridakis, E. Koutroulis and F. Blaabjerg, "Optimization of SiC-Based H5 and Conergy-NPC Transformerless PV Inverters," in IEEE Journal of Emerging and Selected Topics in Power Electronics, vol. 3, no. 2, pp. 555-567, June 2015.
6. W. Li, Y. Gu, H. Luo, W. Cui, X. He and C. Xia, "Topology Review and Derivation Methodology of Single-Phase Transformerless Photovoltaic Inverters for Leakage Current Suppression," in IEEE Transactions on Industrial Electronics, vol. 62, no. 7, pp. 4537-4551, July 2015.
7. Y. Zhou, W. Huang, P. Zhao and J. Zhao, "A Transformerless Grid-Connected Photovoltaic System Based on the Coupled Inductor Single-Stage Boost Three-Phase Inverter," in IEEE Transactions on Power Electronics, vol. 29, no. 3, pp. 1041-1046, March 2014.
8. L. Zhang, K. Sun, Y. Xing and M. Xing, "H6 Transformerless Full-Bridge PV Grid-Tied Inverters," in IEEE Transactions on Power Electronics, vol. 29, no. 3, pp. 1229-1238, March 2014.

All of the above-listed publications are hereby incorporated by reference in their respective entireties.

In the meantime, a wide range of power conversion topologies can also be found in a number of patent documents. Below is a exemplary list of those U.S. patent documents.

Exemplary U.S. Patent Documents

| | | | |
|---|---|---|---|
| 8,369,113 | B2 | February 2013 | Rodriguez |
| 8,582,331 | B2 | November 2013 | Frisch et al. |
| 8,971,082 | B2 | March 2015 | Rodriguez |
| 9,071,141 | B2 | June 2015 | Dong et al. |
| 9,093,897 | B1 | June 2015 | Weng et al. |
| 9,148,072 | B2 | September 2015 | Ueki et al. |
| 9,318,974 | B2 | April 2016 | Yoscovich et al. |
| 9,413,268 | B2 | August 2016 | Fu et. al |
| 9,584,044 | B2 | February 2017 | Zhou et al. |
| 9,627,995 | B2 | April 2017 | Ayai |
| 9,641,098 | B2 | May 2017 | Fu et al. |
| 9,692,321 | B2 | June 2017 | Hu et al. |
| 9,806,529 | B2 | October 2017 | Fu |
| 9,806,637 | B2 | October 2017 | Fu |
| 9,812,985 | B2 | November 2017 | Rodriguez |
| 9,831,794 | B2 | November 2017 | Rodriguez |
| 9,866,147 | B2 | January 2018 | Kidera et al. |
| 9,871,436 | B1 | January 2018 | Jiao et al. |
| 9,941,813 | B2 | April 2018 | Yoscovich |
| 10,008,858 | B2 | June 2018 | Garrity |
| 10,033,292 | B2 | July 2018 | Rodriguez |

All of the above-listed exemplary U.S. patent documents are hereby incorporated by reference in their respective entireties.

Prevailing power conversion topologies, including, e.g., those discussed in, e.g., U.S. Pat. Nos. 8,369,113, 9,941,813, 10,008,858, and 10,033,292, which are just some of the examples, in Applicant's view, are still in need of improvement in terms of performance. First, many prevailing inverter topologies have limitations in regards to reducing switching losses, thereby causing each to have output inductor L and passive components that are large in size.

In this aspect, there are a few classes of grid-connected inverter topologies, namely, isolated and none-isolated inverters, mid-frequency (MF) (10 KHz-30 KHz), high frequency (HF) (above 100 KHz) or HF with low frequency (LF) switches inverter topologies. FIGS. 2B, 2C, 2E, and 2H illustrate a few MF inverters. The ability of MF inverters as a whole to reduce switching losses is limited due to its MF switching frequencies. However, due to its limitations in reducing switching losses, such an MF inverter's output inductor L and passive components are relatively large in size, which is undesirable. FIGS. 2F and 2G are MF inverters with LF switches. Those inverter topologies are still limited in terms of controlling its switching losses with its MF switching frequency. As a result, such an inverter topology (of those MF inverters with LF switches) still sees its output inductor L and passive components large in size.

Second, many prevailing inverter topologies have limitations in regards to having reactive power flow capability. For those grid-connected inverter topologies, achieving reactive power flow while connecting the grid is, however, desirable. Inverters with the topologies illustrated in FIGS. 2A, 2D and 2I, can be operated in HF with LF switches. As a result, for such an inverter, its output inductor L can be smaller and higher efficiency can be achieved, thus being relatively okay with the above-discussed first aspect. However, those topologies do not have reactive power flow capability, therefore limiting them to work at unity power generation only.

Reactive power flow capability is seen as a very important feature for today's inverter technology. FIG. 1E shows three configurations of power stage cells. Configuration (A) is unidirectional cell, whose configuration is used in the topologies illustrated in FIGS. 2E and 2I. A skilled artisan readily appreciates and recognizes that this configuration can only supports unidirectional current flow, thus being incapable of having reactive power flow.

Continuing with the discussion on FIG. 1E, configuration (B) of a power stage cell is a conventional half bridge configuration, which supports bidirectional current flow that may include reactive power flow. It is worth noting that this configuration is used in almost all other conventional topologies. Although this bidirectional configuration is easy to be applied in IGBT type's inverter circuit, the associated operation switching frequency is limited. For a modern power semiconductor device such as a MOSFET, higher switching operational frequency is possible. However, high voltage devices have slow recovery times on a body diode of such a semiconductor device, resulting in an inverter suffering from excess switching losses that otherwise can be avoided or reduced. As result, a MOSFET operating in configure (B) has a potential problem of being conducted in shoot-through, causing the inverter to break down.

In yet another aspect, under the presently disclosed configuration (C) illustrated in FIG. 1E, the involved switches are not connected in series as of the same phase leg. Thus, the slow body diode does not conduct current, thereby resulting in the power stage to not have a shoot-through issue, while having the capability of reactive power flow. On the other hand, the coupled inductor and the switch T1 cause the power stage to work equivalent to a half bridge power stage, which is bidirectional. Since there are no two power devices are connected in series, the body diode reverse recovery issue can be avoided. The switch T1 works in ZVS (zero voltage switching) mode, resulting in switching loss being small. This then also improves the aspect of the size of the associated output inductor L and passive components.

Accordingly, there is a need to improve the above-discussed undesirable problems existed in the conventional power conversion topologies.

BRIEF SUMMARY

In one aspect, the presently disclosed novel conversation topologies, as generally illustrated in FIG. 1(A), comprises one or two buck converter(s). Under the presently disclosed conversion topologies, soft switching can be readily achieved, which is in contrast to H bridge or half bridge configurations. During each half cycle of a conduction period, there are two switches in the respective conduction path, which is in contrast to other topologies (where there might have been three or more switches connected in series). As a result, a better efficiency can be achieved, thereby improving on the size of the associated output inductor L and passive components.

In another aspect, under the presently disclosed conversion topologies, each set of output terminals receives low-frequency half wave signals. Thus, undesirable high frequency leakage current is minimized.

In yet another aspect, under the presently disclosed configuration (C) illustrated in FIG. 1E, the involved switches are not connected in series as of the same phase leg. Thus, the slow body diode does not conduct current, thereby resulting in the power stage to not have a shoot-through issue, while having the capability of reactive power flow. On the other hand, the coupled inductor and the switch T1 causes the power stage to work equivalent to a half bridge power stage, which is bidirectional. Since there is no two power devices are connected in series, the body diode reverse recovery issue can be avoided. The switch T1 works in ZVS (zero voltage switching) mode, resulting in switch-ing loss being small. This then also improves the aspect of the size of the associated output inductor L and passive components.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures, unless expressly specified, have not necessarily been drawn to scale. Also, any text and/or any numerical data (numbers) appeared on any drawing figures is provided to illustrate an exemplary embodiment or implementation, and thus is provided for the purpose of illustration and not for the purpose of limitation. For example, the dimensions of some of the elements may be exaggerated relative to other elements. Embodiments incorporating teachings of the present disclosure are shown and described with respect to the figures presented herein, in which:

FIG. 3B depicts exemplary timing diagrams in connection with the modulation strategy of the presently disclosed DC-AC converter for FIG. 3A.

FIGS. 4A-4D illustrate four respective operation modes for the presently disclosed DC-AC converter for FIG. 3A, including exemplary respective timing diagrams associated with four operation modes.

DETAILED DESCRIPTION

In the following detailed description of exemplary embodiments of the disclosure in this section, specific exemplary embodiments in which the disclosure may be practiced are described in sufficient detail to enable those skilled in the art to practice the disclosed embodiments. However, it is to be understood that the specific details presented need not be utilized to practice embodiments of the present disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Moreover, the use of the terms first, second, etc. do not denote any order or importance, but rather the terms first, second, etc. are used to distinguish one element from another.

Those of ordinary skill in the art will appreciate that the components and basic configuration depicted in the following figures may vary. Other similar or equivalent components may be used in addition to or in place of the components depicted. A depicted example is not meant to imply limitations with respect to the presently described one or more embodiments and/or the general disclosure.

Figure 1A:
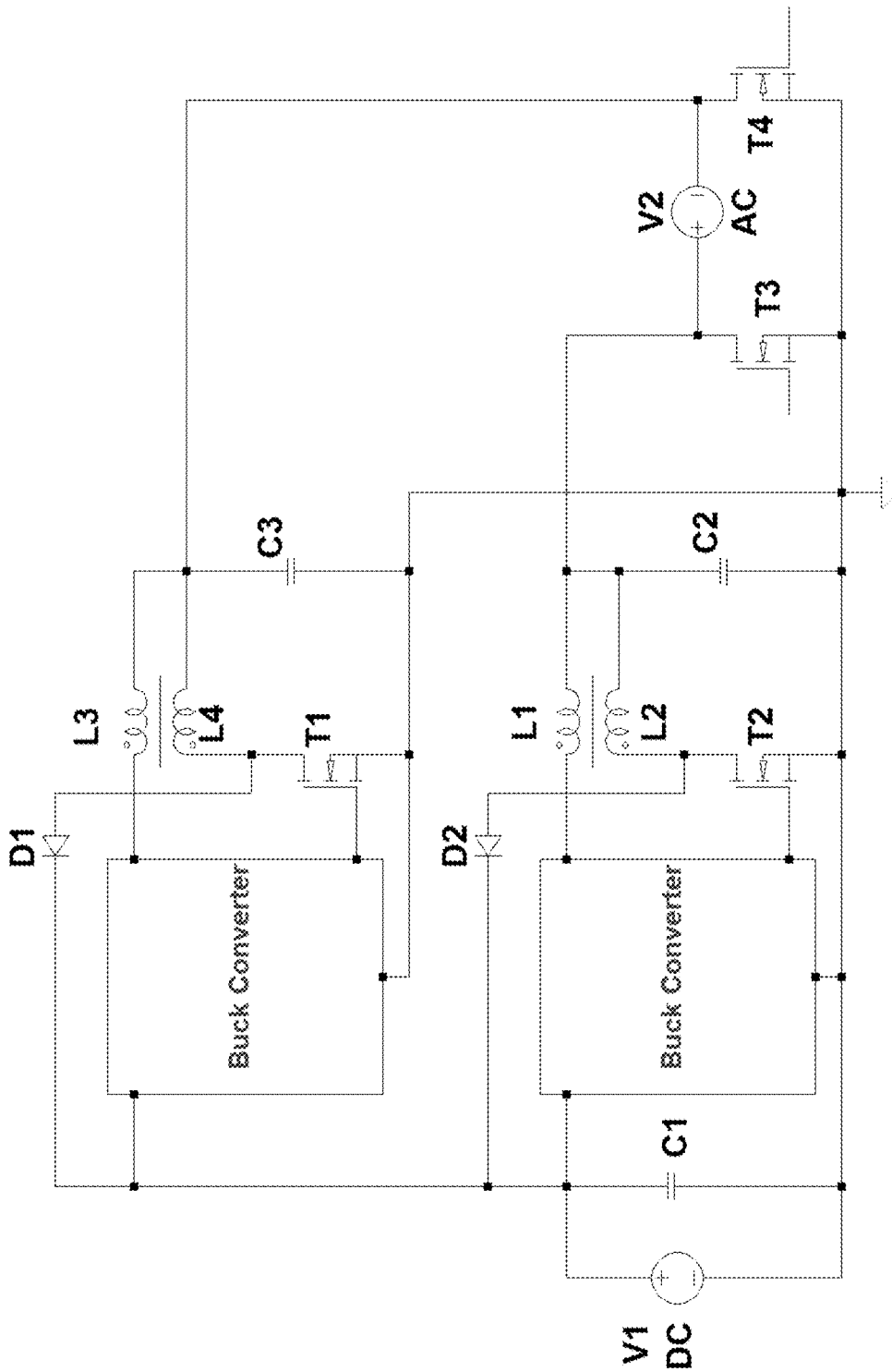
FIG. 1A illustrates general form of the presently disclosed DC-AC inverter.
Figure 1B:
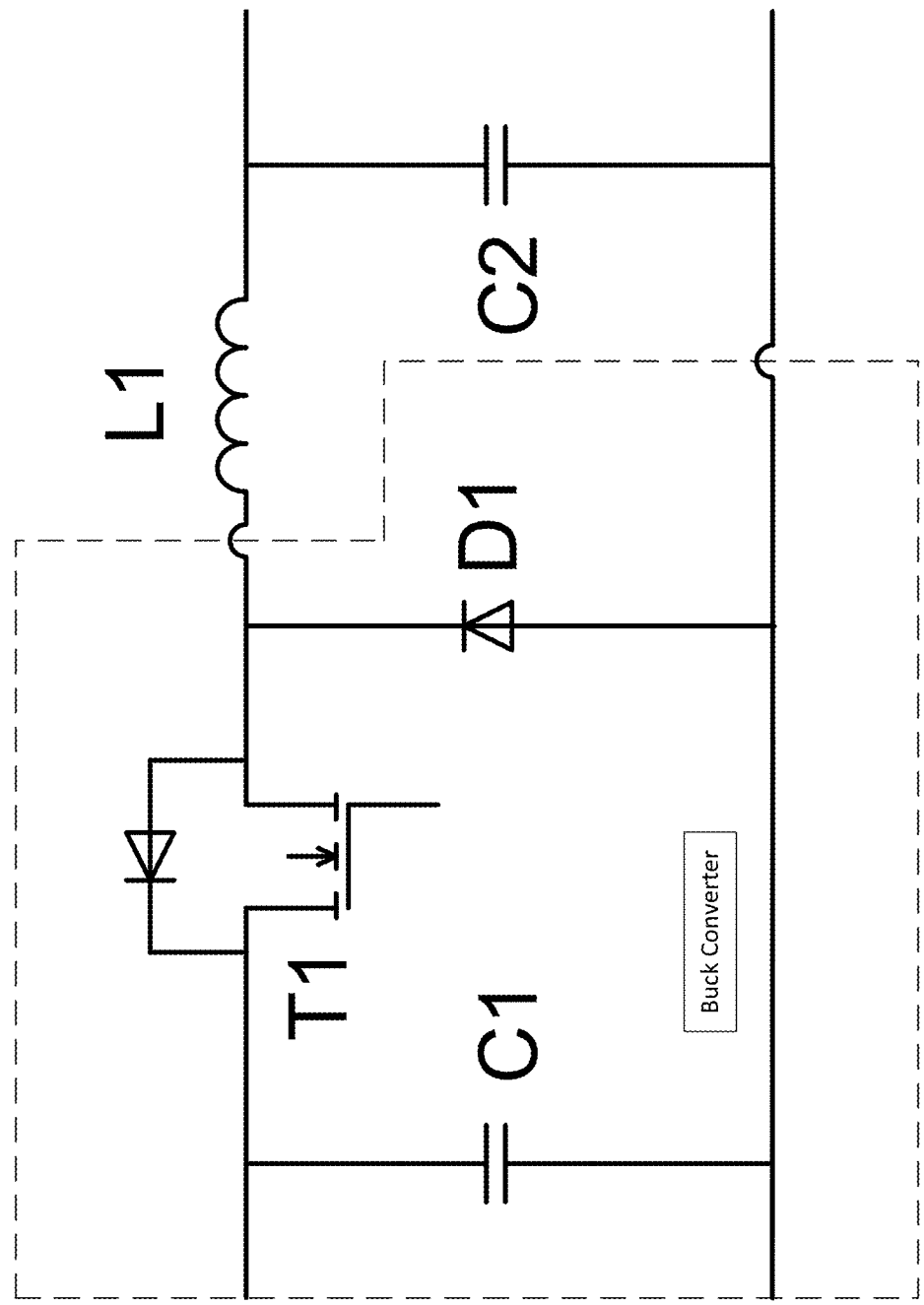
FIGS. 1B and 1C show exemplary choices of the buck converter shown in FIG. 1A.
Figure 1C:
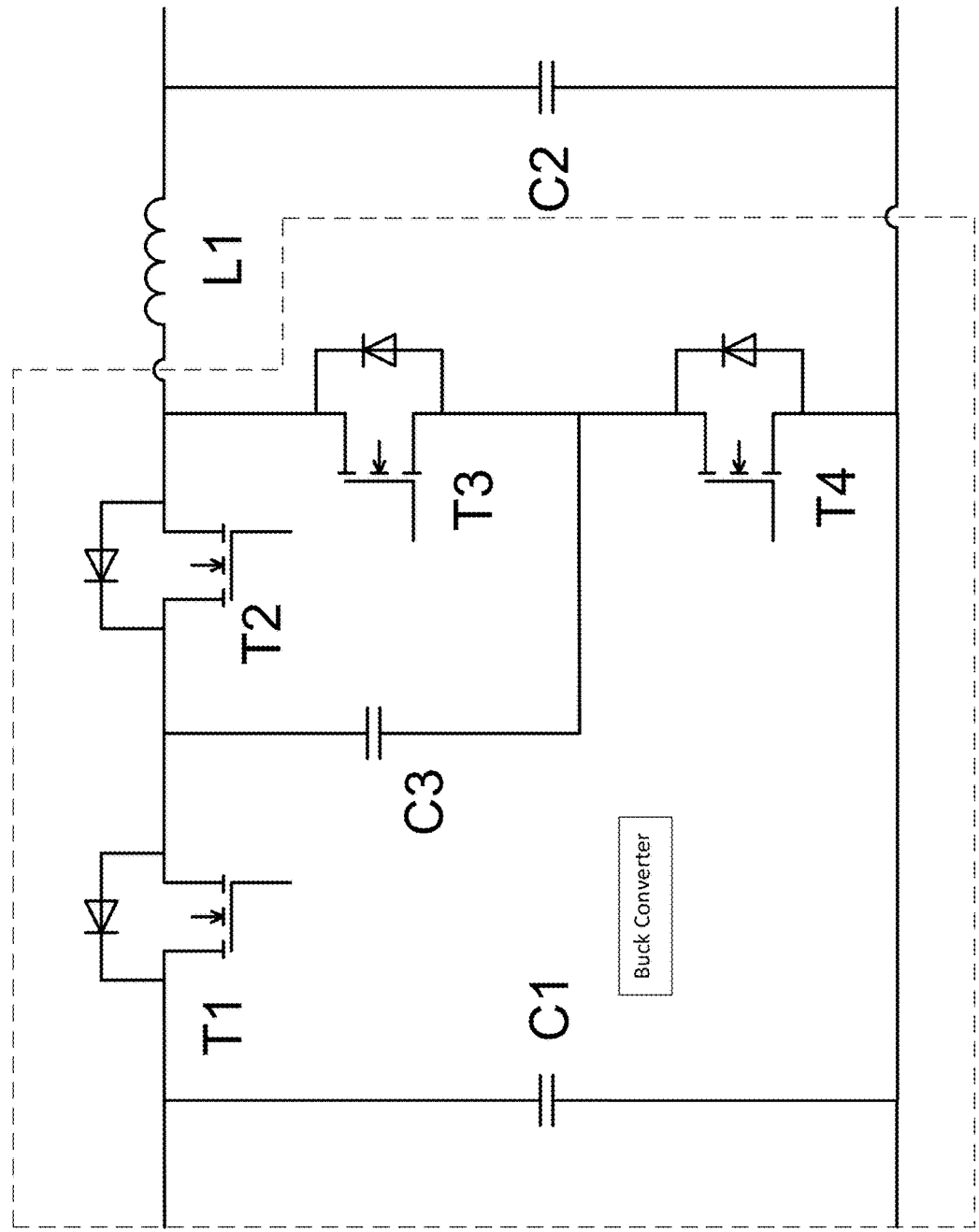
Figure 1D:
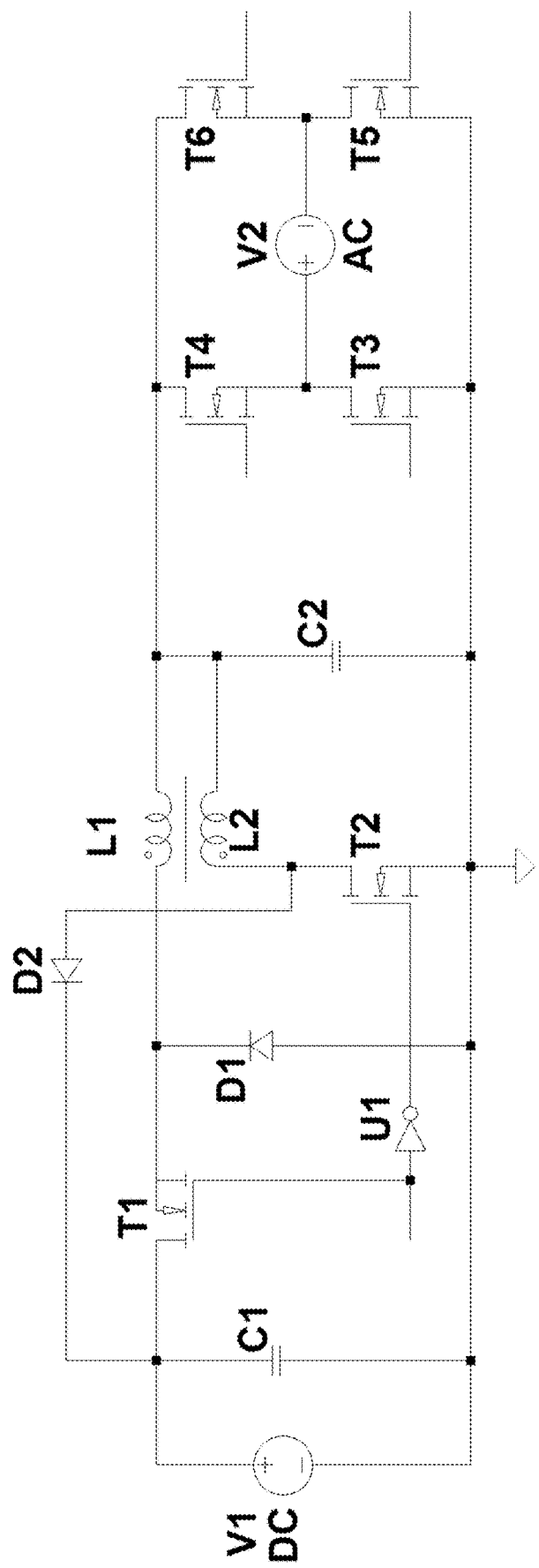
FIG. 1D illustrates an example of the presently disclosed DC-AC Inverter with one buck converter and four low frequency switches.
Figure 1E:
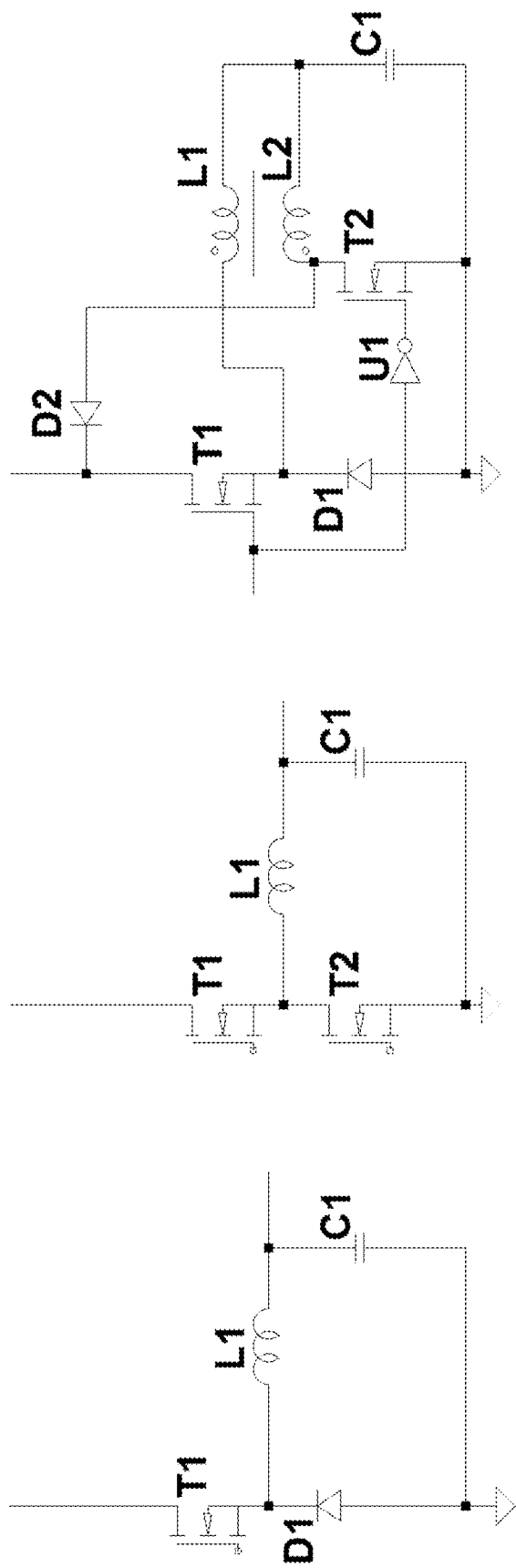
FIG. 1E illustrates comparisons among unidirectional and bidirectional cell configurations.
Figure 2A:
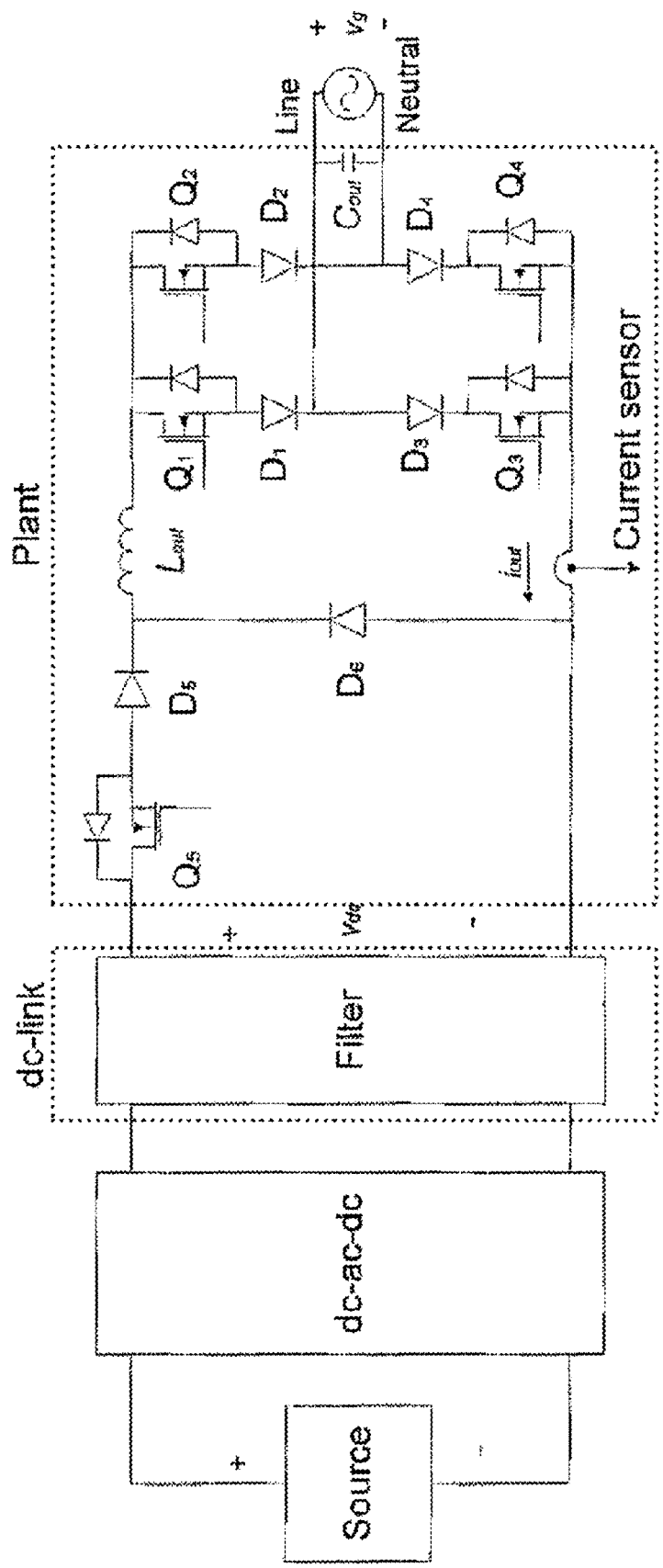
FIGS. 2A-2I illustrate respective conversion topologies in the related art.
Figure 2B:
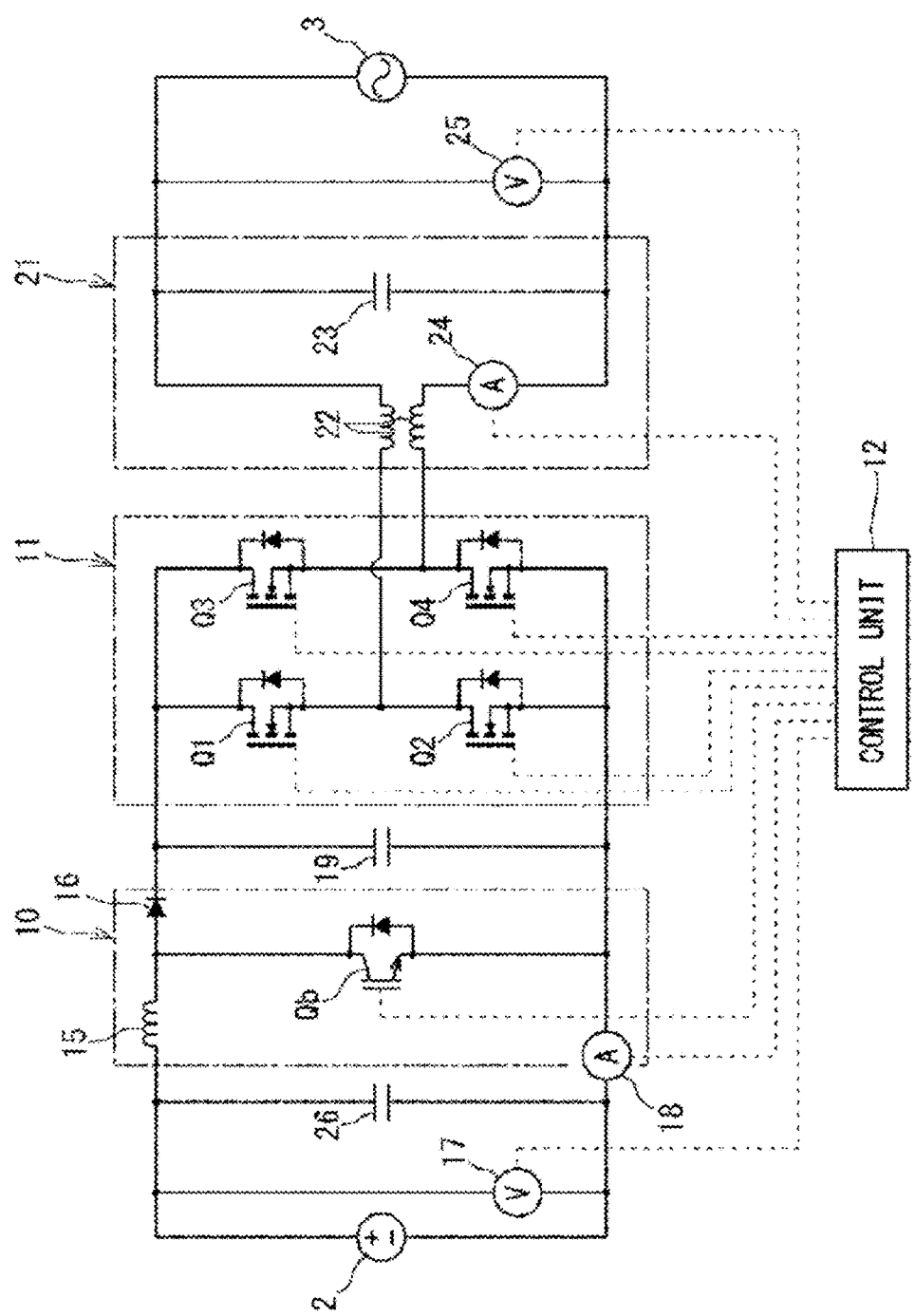
Figure 2C:
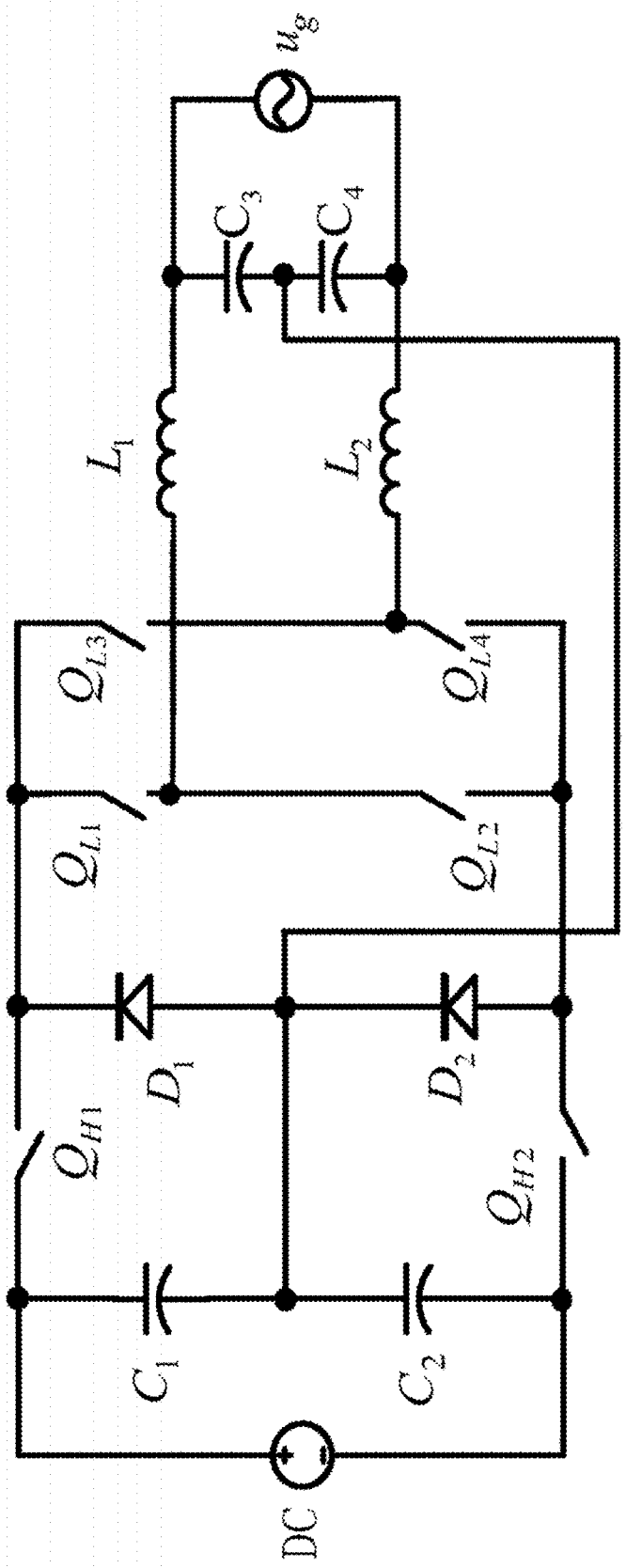
Figure 2D:
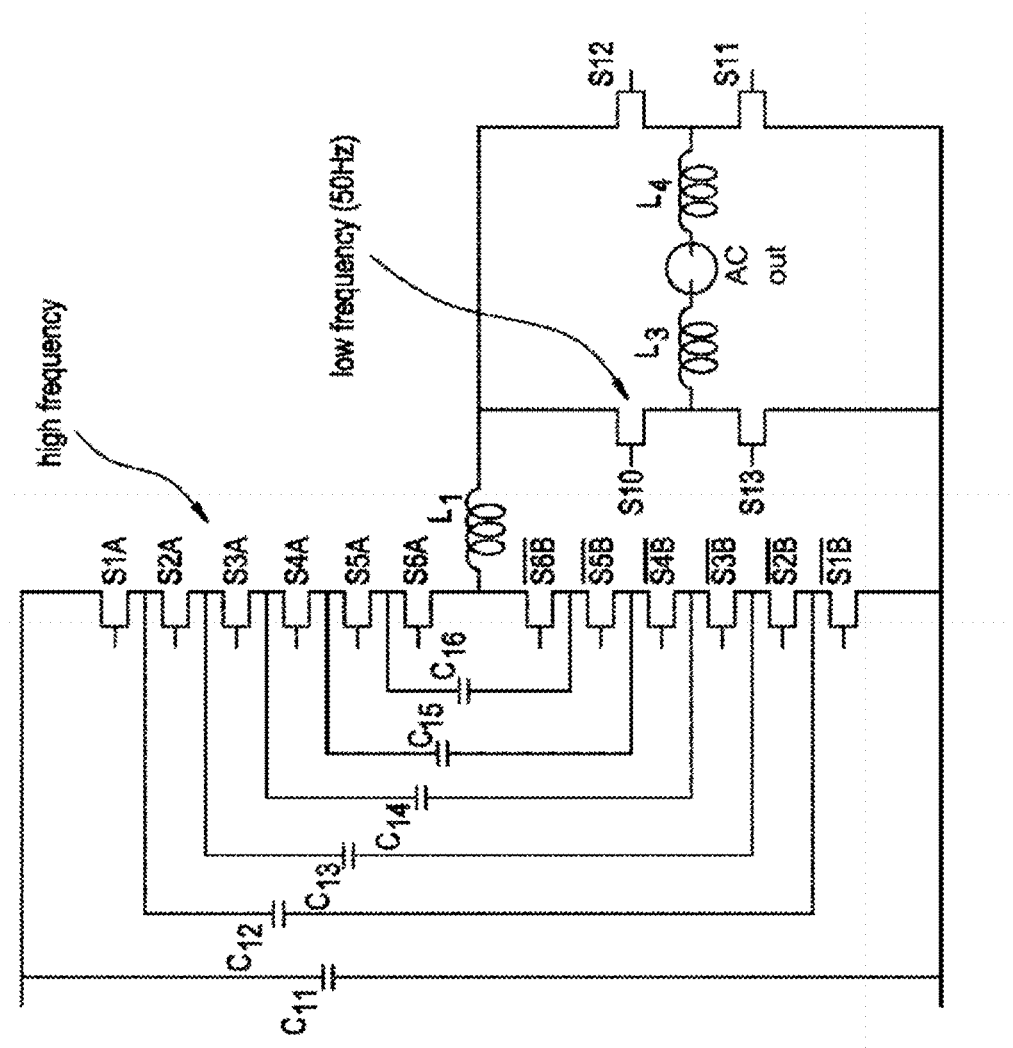
Figure 2E:
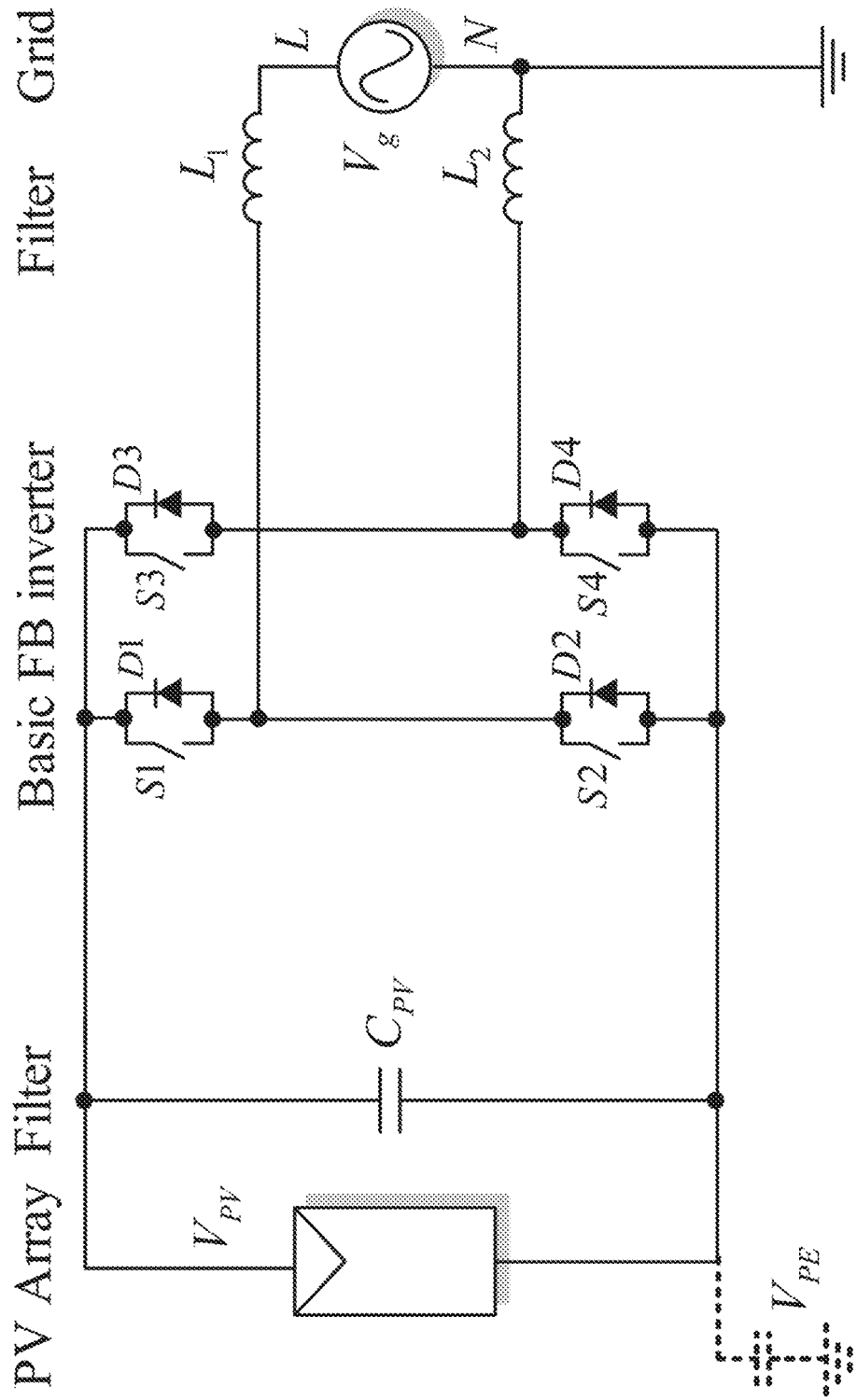
Figure 2F:
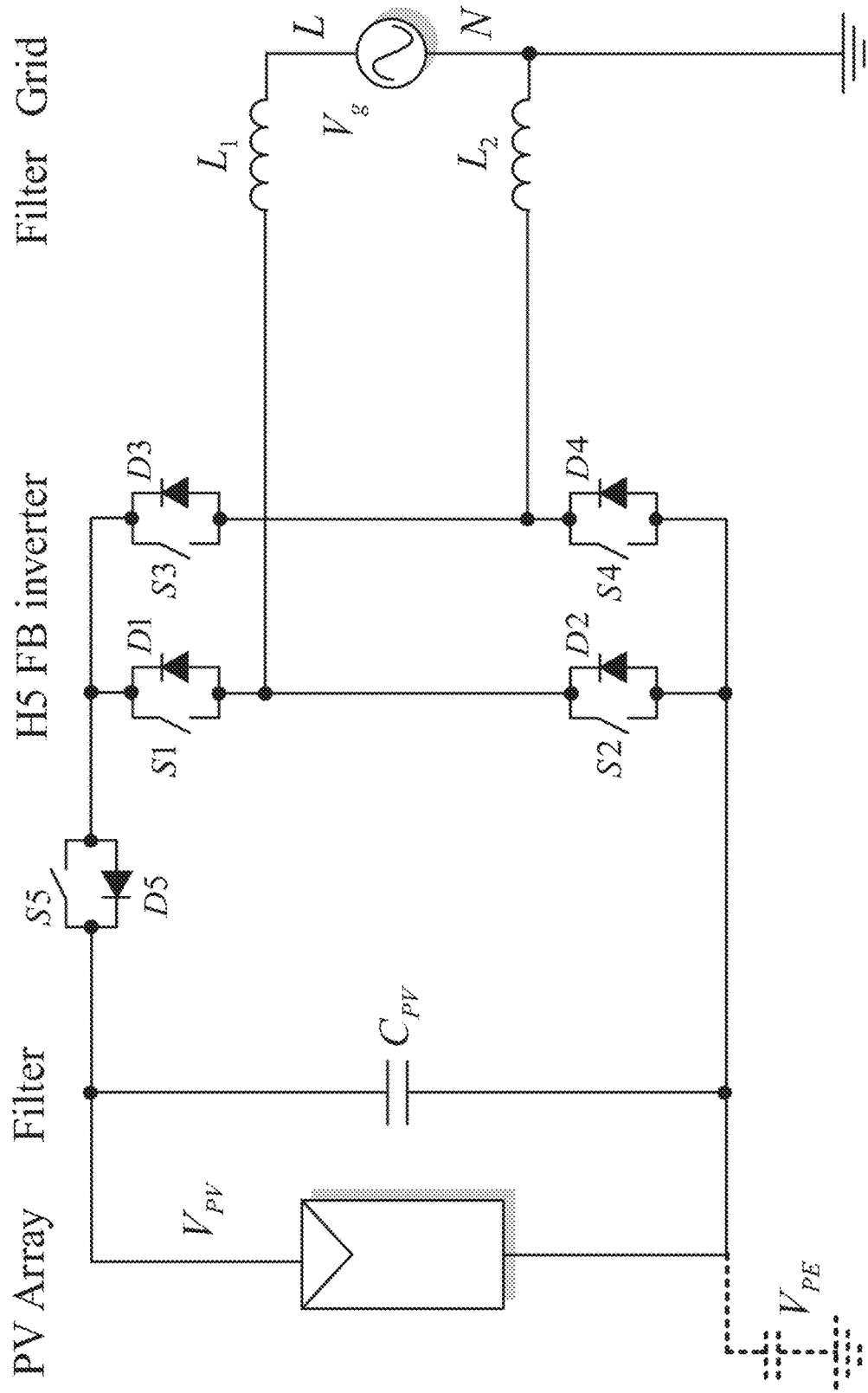
Figure 2G:
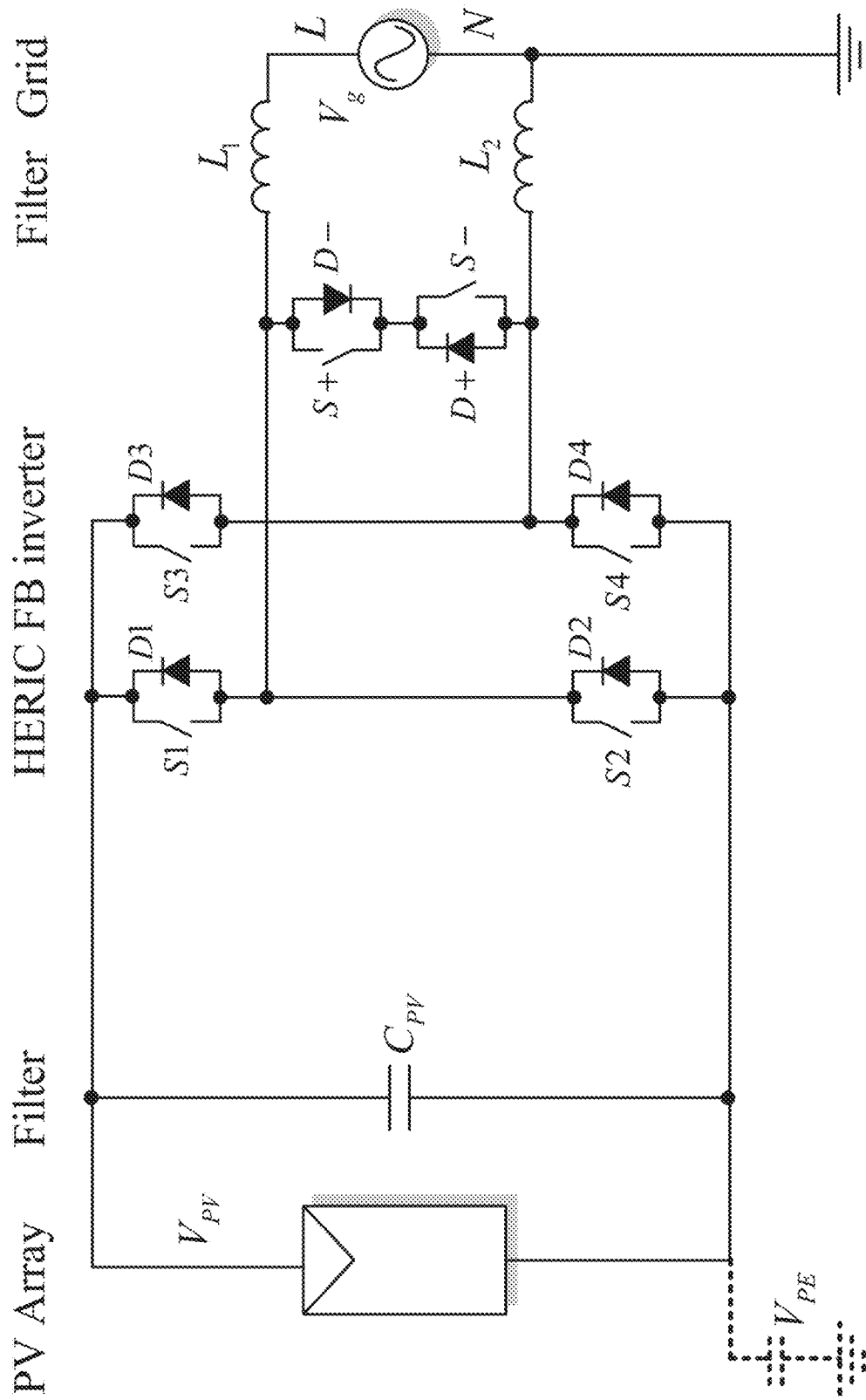
Figure 2H:
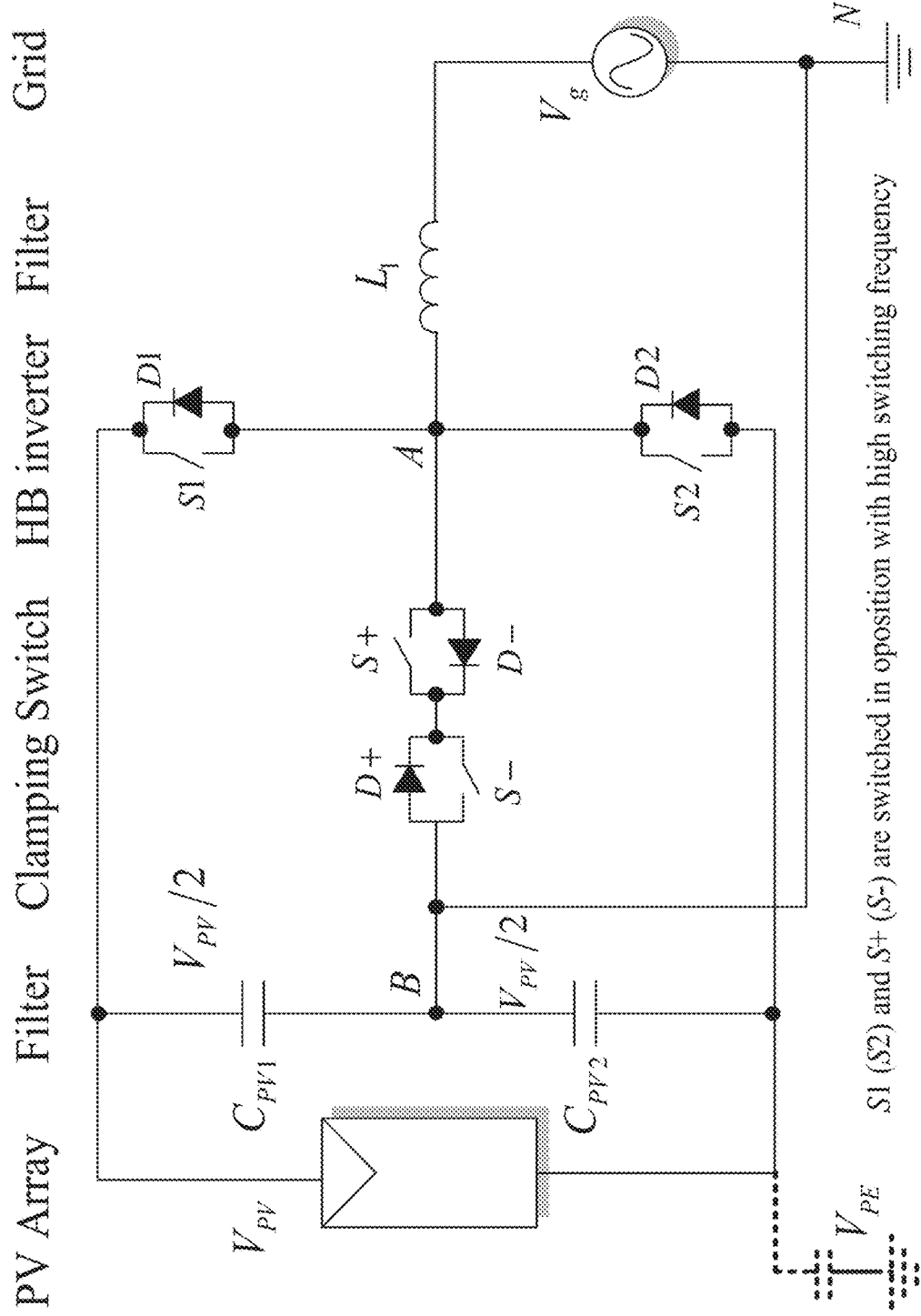
Figure 2I:
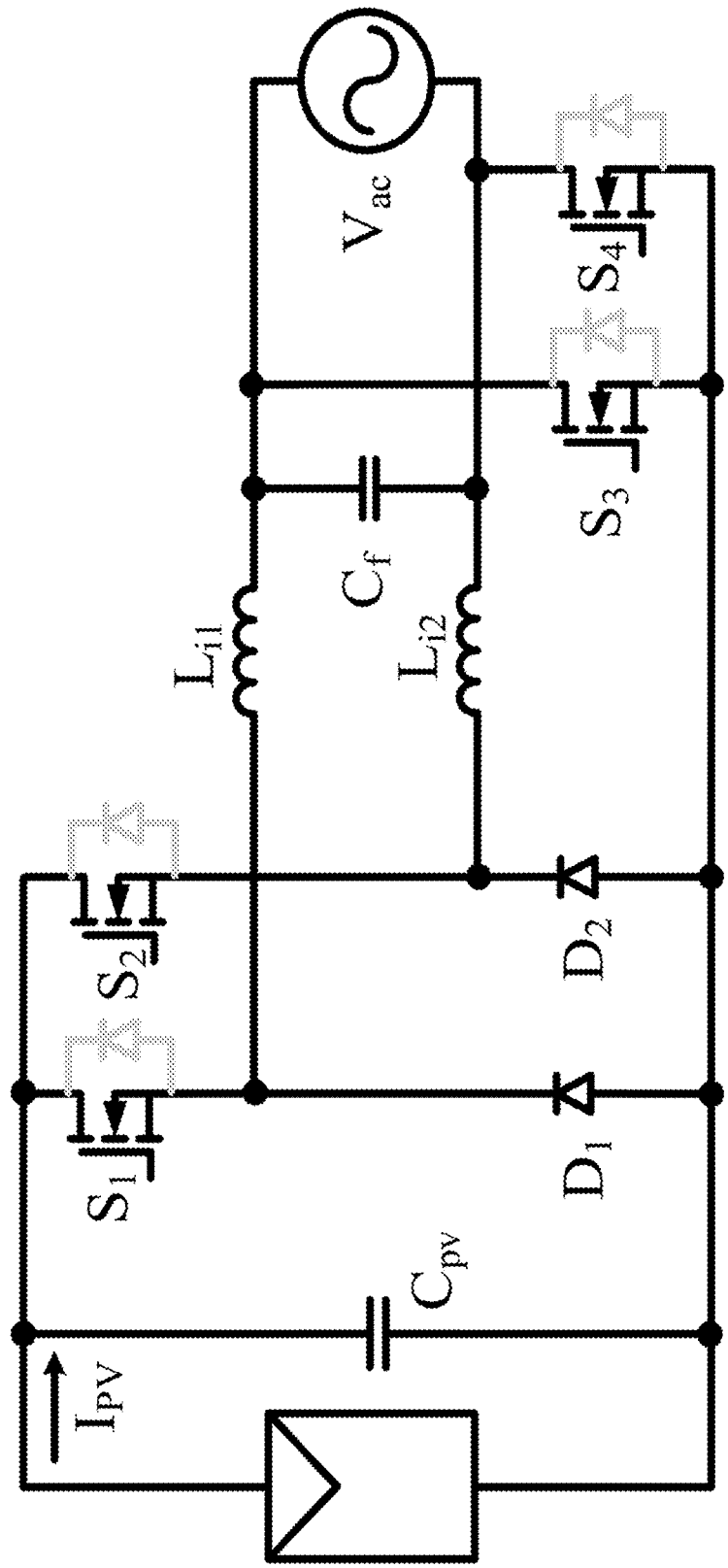

The presently disclosed DC-AC converter is illustrated in general form in FIG. 1A, comprising two buck converters and two low frequency switches. Referring to FIG. 1A, the DC source can be photovoltaic arrays, batteries, fuel cells or others. The AC source can be utility grid, single-phase electric motors or others. Each front converter can be any unidirectional converter that can generate half sinusoidal waveform at the frequency of the connected AC source, including but not limited to a classic unidirectional buck converter (shown FIG. 1B) and a three-level bidirectional buck converter (shown in FIG. 1C) or any other kind of buck converter. The two converters can be identical, or combinations of any buck converters.

Figure 3A:
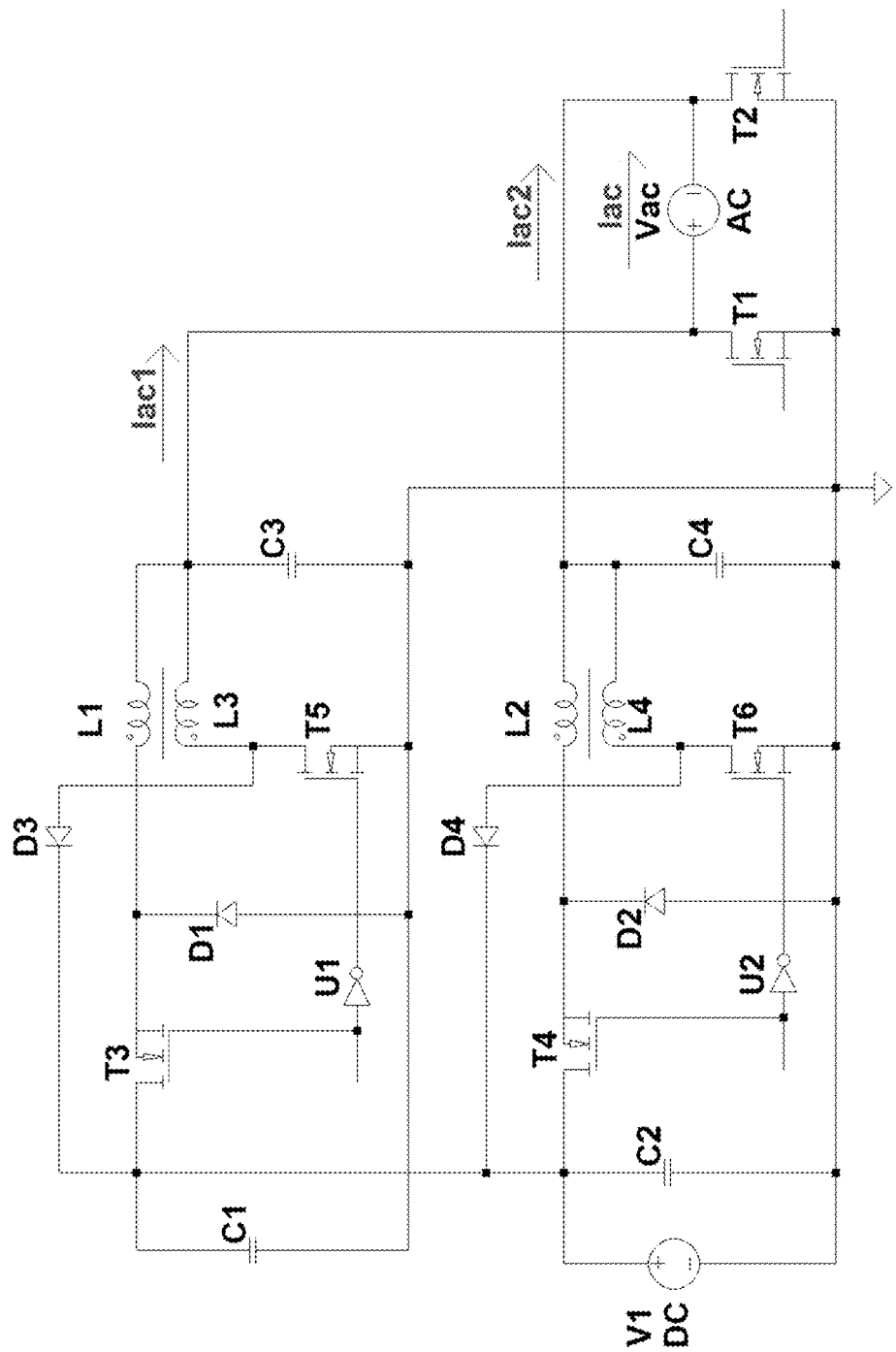
FIG. 3A illustrates an example of the presently disclosed DC-AC Inverter with two buck converters and two low frequency switches.
Figure 3C:
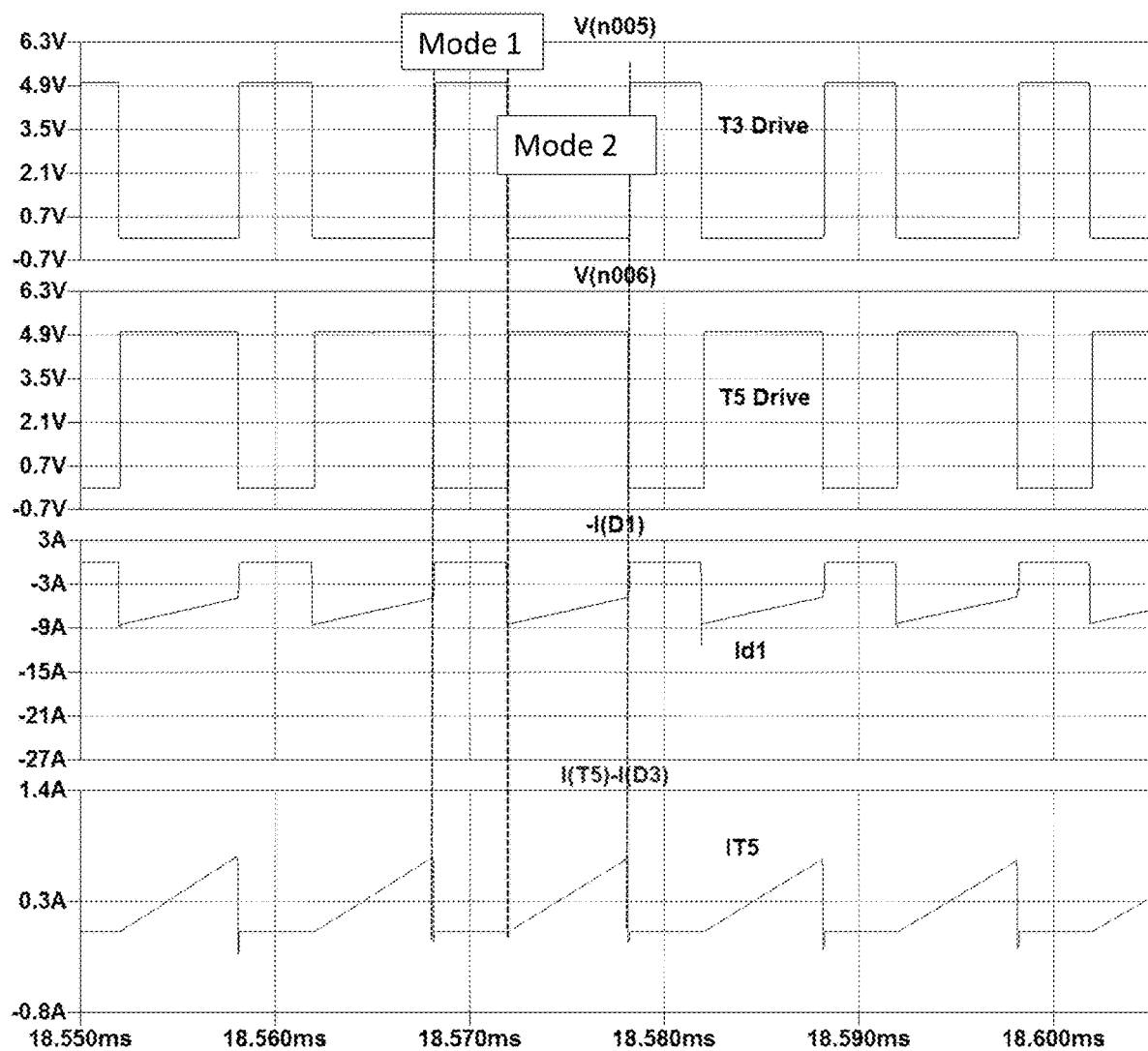
FIGS. 3C-D illustrate exemplary timing diagrams in connection with modulating timing for the presently disclosed DC-AC converter for FIG. 3A.
Figure 3D:
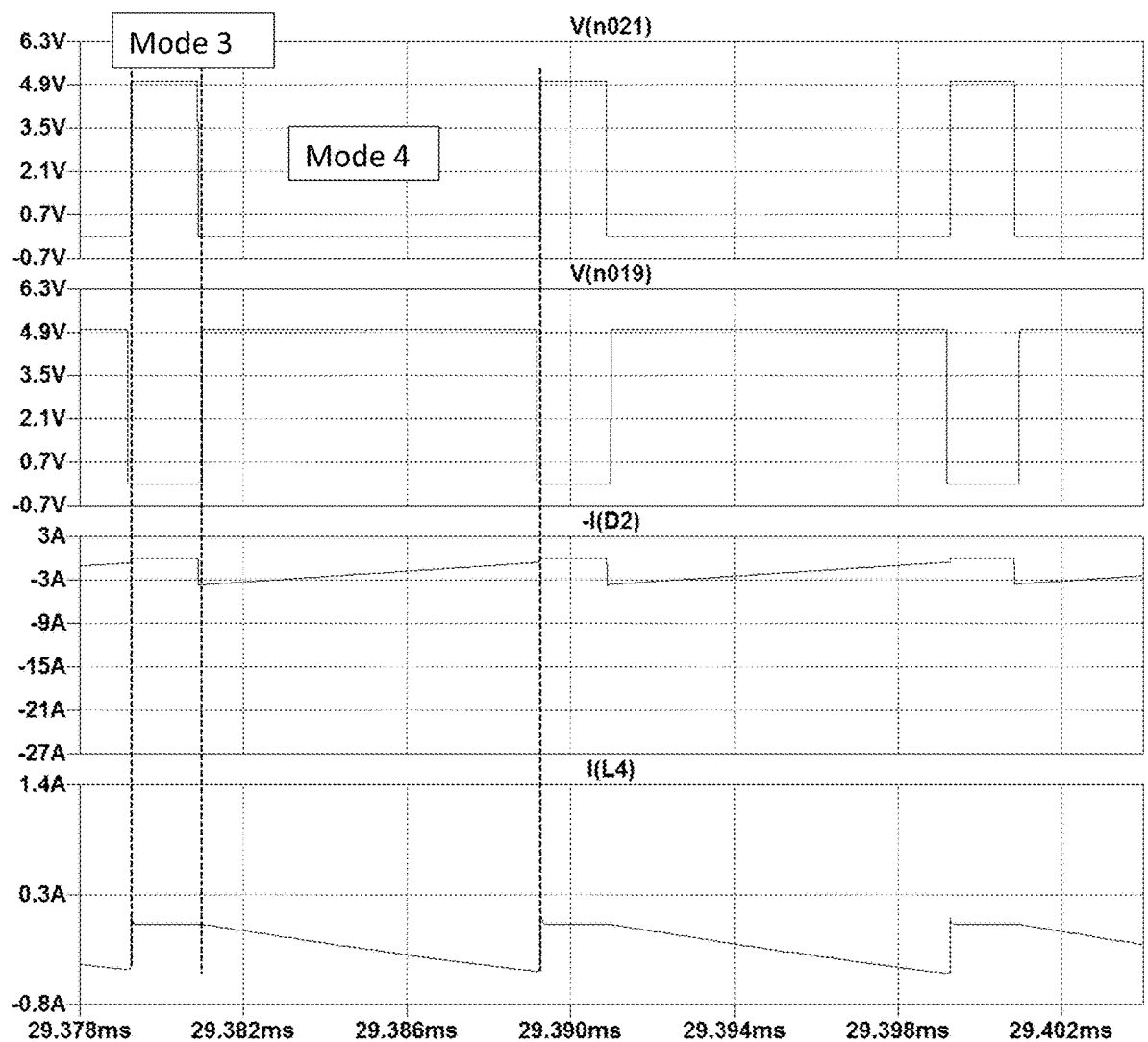

FIG. 3A shows a presently disclosed DC-AC converter with classic buck converter configured with bidirectional cell as an example for description. One possible modulation strategy is depicted in FIGS. 3B-D, together with AC voltage and current waveforms. Four possible operation modes of the presently disclosed inverter in unity power generation with the described modulation strategy are respectively demonstrated in FIGS. 4A-4D.

Figure 4E:
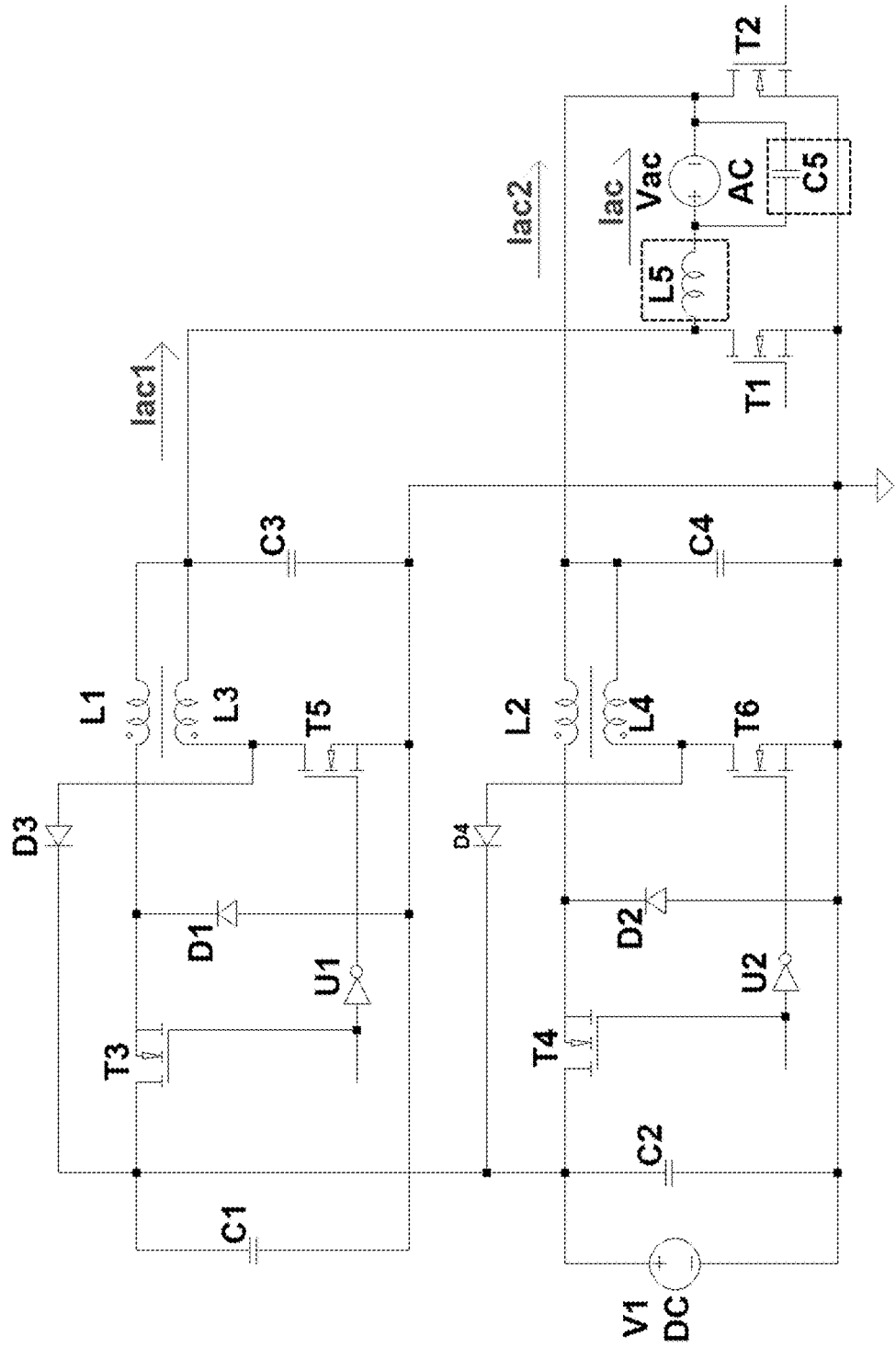
FIG. 4E illustrates an example of the presently disclosed DC-AC Inverter receiving reactive power flow from a large inductor series or large capacitor parallel with Vac.
Figure 4F:
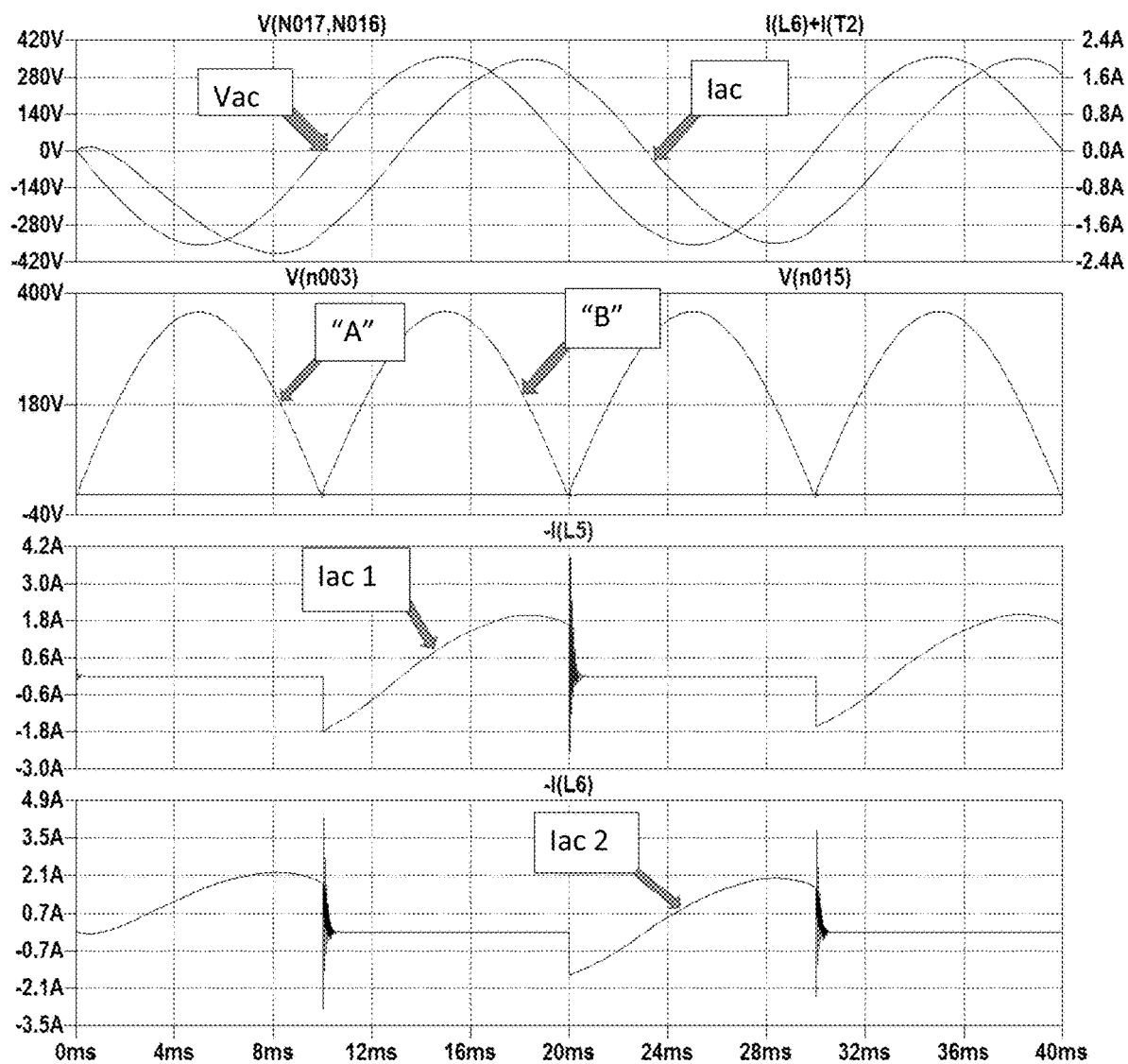
FIGS. 4F and 4G illustrate exemplary respective timing diagrams in connection with how the presently disclosed DC-AC Inverter handles reactive power flow from an exemplary inductive load and an exemplary capacitive load.
Figure 4G:
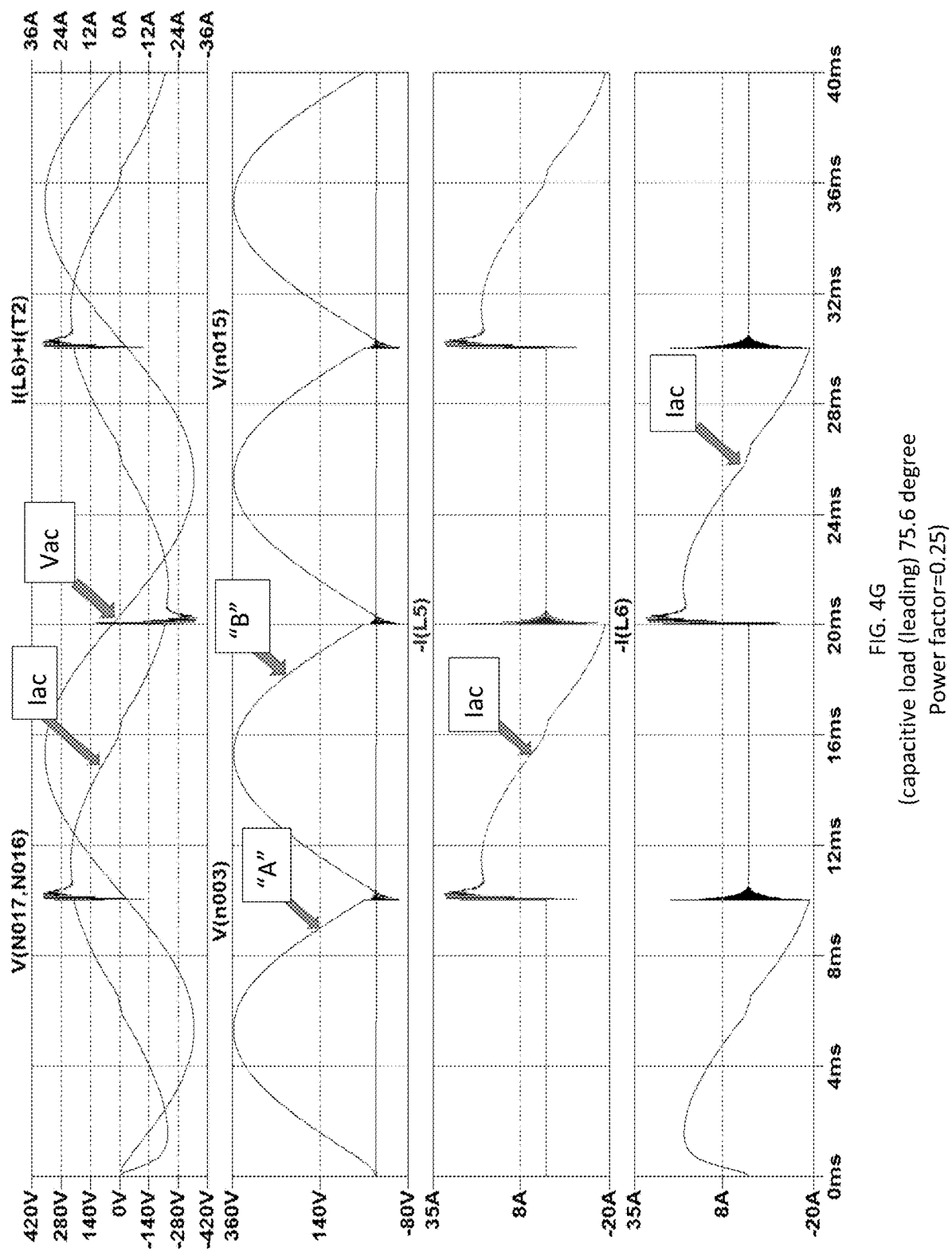

For reactive power generation mode in connection with the presently disclosed topologies, FIGS. 4E-4G provide an exemplary configuration diagram and examples of reactive power flow associated with the exemplary configuration, respectively.

Mode 1

Referring to FIG. 4A and FIG. 3B, during this mode, T3 operates in PWM in generating an AC waveform using known general configurations that involve one or more suitable inductors and one or more suitable capacitors. T2 works as a low frequency switch. The converter generates half wave AC at point "A", while T1 and T4 are off. Accordingly, power transfers from the DC source to inductors L1 to output capacitor C3 and the AC source. As a result, half wave of the AC sinusoidal is generated crosses AC source. As indicated in the timing diagrams, T5, which works simultaneously with T3 and is coupled to L3, conducts the freewheeling current through forward-biased D1 (otherwise reversed-biased during T3 ON periods) during T3 OFF periods.

Mode 2

Referring to FIG. 4B and FIG. 3B, during this mode, which can also be appreciated as a specific sub-mode during Mode 1, T2 and D1 are ON, while T1, T3 and T4 are OFF and T5 is ON. Power transfers from the inductors L1, L3, capacitor C3 to the AC source. D1 keeps the freewheeling current flow of the inductor L1 due to T5 being on, with inductor L3, which is coupled to T5, engaging T5 to connect the freewheeling current as well.

Mode 3

Referring to FIG. 4C and FIG. 3D, this mode mirrors Mode 1, except for generating the other half wave of the AC sinusoidal. Thus, as a skilled artisan readily appreciate, the operation of Mode 3 corresponds with the operation of Mode 1, except for that the other low-frequency T1 is ON, T4 operates in PWM, while the corresponding switches of T1 and T4, namely, T2 and T3, are off. Thus, power transfers from the DC source to inductor L2 (which corresponds to L1) to output capacitor C4 (which corresponds to C3) and the AC source. As a result, the other half wave of the AC sinusoidal is generated crosses AC source. As indicated in the timing diagrams, T6 (which corresponds with T5), which works simultaneously with T4 and is coupled to L4, conducts the freewheeling current through forward-biased D2 (otherwise reversed-biased during T4 ON periods) during T4 OFF periods.

Mode 4

Referring to FIG. 4D and FIG. 3D, this mode mirrors Mode 2, except for generating the other half wave of the AC sinusoidal. Thus, Mode 4 can also be appreciated as a specific sub-mode during Mode 3. Accordingly, during this mode, T1 and D2 are ON, while T2, T3 and T4 are OFF and T6 is ON. Power transfers from the inductors L2, L4, capacitor C4 to the AC source. D2 keeps the freewheeling current flow of the inductor L2 due to T6 being on, with inductor L4, which is coupled to T6, engaging T6 to connect the freewheeling current as well.

Reactive Power Flow Mode

Referring to FIGS. 4E, 4F and 4G, during this mode, load (AC source) is reactive, with either inductive load (lagging) or capacitive load (leading). As indicated in FIGS. 4F and 4G, the output current is out of phase with the output voltage, the coupled inductor L1 and L3, L2 and L4 engage the freewheeling current flow during the intervals when T5 and T4 are on. And with the diodes D1 and D2 of the combination conducting the current, the bidirectional current flow is established. See Iac1 and Iac2 in FIGS. 4F and 4G. Those currents travel in two directions, showing the bidirectional current flow.

In summary, during the positive sinusoidal cycle ($v_{ac}>0$), T1 remains off and T2 remains on. T3, D1 and T5 turn on and off in a complementary way to generate required current $i_{ac1}$, whereas T4 and D2 remain off. For the negative sinusoidal cycle ($v_{ac}<0$), T1 remains on and T2 remains off.

T4, D2 and T6 turn on and off in a complementary way to generate required current $i_{ac2}$, whereas T3 and D1 remain off.

While the disclosure has been described with reference to one or more exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure.

What is claimed is:

1. A full-wave-switching (FWS) DC-AC inverter apparatus comprising:

(a) a set of one or more bidirectional power stage cells, each said bidirectional cell coupled between a DC power source and an AC power source, the AC power source having two alternate terminals of opposite polarities and configured to have a low-frequency (LF) AC sinusoidal waveform at an AC power frequency, each said cell configured to have a respective cell output terminal, and conduct bidirectional current to and from the respective cell output terminal, each said cell configured to generate, at the respective cell output terminal, a respective outgoing cell output current having a respective LF AC periodic waveform configured, for one respective half of each of its cycles, to have a respective half wave of, and to be in synchrony with, the AC sinusoidal of a respective half cycle of the AC power source, each said bidirectional power stage cell comprising:

a respective unidirectional buck converter configured to receive DC power from the DC power source and comprising a respective set of one or more high-frequency (HF) switches, the respective buck converter configured, in said cell's generating of the respective cell output current, to alternately bias on and off the respective set of one or more HF switches in HF under a respective modulation scheme, so as to generate and flow out, at and from a respective buck converter output terminal thereof, a respective unidirectional buck converter output current modulated in HF;

a respective filter coupled to the respective buck converter, and configured to receive the respective unidirectional buck converter output current modulated in HF and generate, at the respective cell output terminal, the respective cell output current; and a respective reactive-power-flow-enabler (RPFE) circuitry coupled to the respective cell output terminal, and configured to enable receiving and flowing of incoming reactive power from the AC power source to the respective cell output terminal, the respective RPFE circuitry comprising a respective set of one or more HF switches configured to be oppositely biased on and off with respect to the respective set of one or more HF switches of the respective buck converter, and conduct there-through a respective freewheeling current of the respective buck converter; and (b) first and second LF switch sets, each said LF switch set comprising one or more member LF switches each coupled to one respective terminal of the two terminals of the AC power source, with one respective said member LF switch of each said LF switch set coupled to the ground, each said LF switch set configured to have each of its one or more member LF switches act in respective uniformity and synchrony with one another with respect to being biased on and biased off; and wherein said first and second LF switch sets are configured to be oppositely biased on and off, and are each configured, for each respective cycle of the AC power source and with respect to two opposite directions of current flow across the two terminals of the AC power source, to be alternately biased on and off in respective synchrony with the two respective half waves of AC sinusoidal of the respective cycle of the AC power source so as to, with respect to a respective said cell output current, alternately allow the respective half wave of AC sinusoidal thereof, and disallow the other respective half wave thereof, to flow across the two terminals of the AC power source in one respective direction to the ground, but which is alternate opposite to the respective other direction with respect to the other said LF switch set, thereby achieving flowing of a current having full wave switching (FWS) of AC sinusoidal, across the two terminals of the AC power source to the ground at the AC power frequency.

2. The FWS DC-AC inverter apparatus of claim 1, wherein for at least one said bidirectional power stage cell, the respective RPFE circuitry further comprises one respective inductor coupled between the respective cell output terminal and one end of at least one said respective HF switch, and configured to receive and store reactive power flowing from the AC power source and engage the respective one or more set of HF switches to conduct the respective freewheeling current of the respective buck converter.

3. The FWS DC-AC inverter apparatus of claim 2, wherein for at least one said bidirectional power stage cell, the respective RPFE circuitry further comprises one respective diode coupled between a first respective common node between the respective inductor and the respective at least one HF switch, and one respective input terminal of the respective buck converter configured to receive DC power, the one respective diode of the respective RPFE circuitry forward biased from the first respective common node to the one respective input terminal of the respective buck converter.

4. The FWS DC-AC inverter apparatus of claim 1, wherein said set of one or more bidirectional power stage cells consists of one single bidirectional power stage cell, and each LF switch set of said first and second LF switch sets comprises a respective first LF switch and a respective second LF switch; and wherein for said first and second LF switch sets, their respective first LF switches each having respective first and second ends, are both coupled, at respective first ends, to the cell output terminal of the single bidirectional power stage cell, and are alternately coupled, at respective second ends, to the two alternate terminals of the AC power source; and wherein for each of said first and second LF switch sets, its respective second LF switch is coupled between the ground and the respective other terminal of the AC power source opposite to the respective terminal of the AC power source to which its respective first LF switch is coupled.

5. The FWS DC-AC inverter apparatus of claim 1, wherein said set of one or more bidirectional power stage cells consists of first and second bidirectional power stage cells and said first and second LF switch sets each consist of a single respective member switch;

wherein the respective single member switches of said first and second LF switch sets are respectively coupled to the two alternative opposite terminals of the AC power source;

wherein the first and second bidirectional power stage cells respectively correspond to the first and second LF switch sets, in that for each of the first and second LF switch sets, said respective cell output current flows from the respective bidirectional power stage cell to the respective other terminal of the AC power source opposite to the respective terminal of the AC power source to which the respective single member switch of the respective LF switch set is coupled.

6. The FWS DC-AC inverter apparatus of claim 1, wherein for each said power stage cell, each of the respective set of one or more HF switches of the respective buck converter is configured to work in a mode of zero voltage switching (ZVS).

7. The FWS DC-AC inverter apparatus of claim 1, wherein for each said power stage cell, the respective modulation scheme, as applied to the respective set of one or more HF switches, comprises a pulse width modulation (PWM) scheme.

8. The FWS DC-AC inverter apparatus of claim 1, wherein for each said power stage cell, in the respective power stage cell's generating of the respective cell output current having the respective LF periodic AC waveform, the respective filter comprises a low-pass LC filter.

9. The FWS DC-AC inverter apparatus of claim 1, wherein for at least one of the set of one or more bidirectional power stage cells, the respective buck converter comprises a three-level bidirectional buck converter.

10. The FWS DC-AC inverter apparatus of claim 1, wherein for at least one of the set of one or more bidirectional power stage cells, the respective buck converter comprises a unidirectional buck converter.

11. The FWS DC-AC inverter apparatus of claim 1, wherein the set of one or more bidirectional power stage cells consists of multiple bidirectional power stage cells, the respective buck converters of said multiple bidirectional power stage cells are different from one another.

\* \* \* \* \*